(12) United States Patent
Hicks et al.

(10) Patent No.: US 10,357,909 B2
(45) Date of Patent: Jul. 23, 2019

(54) THERMOSET IN-MOLD FINISHING FILM

(71) Applicants: Absolute Exhibits, Inc., Tustin, CA (US); Thomas Paul Hicks, Tustin, CA (US)

(72) Inventors: Thomas Paul Hicks, Tustin, CA (US); Jozef Bicerano, Midland, MI (US)

(73) Assignee: ABSOLUTE EXHIBITS, INC., Tustin, CA (US)

( * ) Notice: Subject to any disclaimer, the term of this patent is extended or adjusted under 35 U.S.C. 154(b) by 1044 days.

(21) Appl. No.: 14/725,957

(22) Filed: May 29, 2015

(65) Prior Publication Data
US 2016/0031135 A1 Feb. 4, 2016

Related U.S. Application Data

(60) Provisional application No. 62/005,103, filed on May 30, 2014.

(51) Int. Cl.
*B29C 37/00* (2006.01)
*B29C 45/16* (2006.01)
(Continued)

(52) U.S. Cl.
CPC ...... *B29C 45/1679* (2013.01); *B29C 37/0032* (2013.01); *B29C 45/0001* (2013.01);
(Continued)

(58) Field of Classification Search
CPC ............ B29C 45/1679; B29C 37/0032; B29C 45/0001; B32B 38/145; B32B 37/025; B32B 38/1808; C09D 175/06
See application file for complete search history.

(56) References Cited

U.S. PATENT DOCUMENTS 2,245,651 A 6/1941 Craig et al.
3,379,592 A 4/1968 Ostrowicz
(Continued)

FOREIGN PATENT DOCUMENTS

CN 102673293 9/2012
CN 102744939 10/2012
(Continued)

OTHER PUBLICATIONS

Machine translation of CN 102744939A (Year: 2012).*
(Continued)

*Primary Examiner* — Joseph S Del Sole
*Assistant Examiner* — John Robitaille
(74) *Attorney, Agent, or Firm* — Morgan Lewis & Bockius LLP

(57) ABSTRACT

This invention relates to the manufacturing of durable thermoset in-mold finishing films (TIMFFs) combining in-mold decorating and in-mold durable exterior grade coating capabilities, to molded articles having TIMFFs adhering to their surfaces and both showing a decoration and providing protection, and to thermosetting resin formulations used in the manufacturing of TIMFFs. In some embodiments, the thermoset is prepared via polyurethane chemistry; the manufacturing process comprises reaction injection molding (RIM) with a specially designed mold; and articles having TIMFFs adhering to their surfaces include graphic panels for durable signage, structural graphics, molded flooring, prefabricated housing, aerospace structures and body panels, automotive structures and body panels, and marine structures and body panels. In addition to RIM, the TIMFF technology is also compatible with other processes, such as injection molding, compression molding, resin transfer molding, spin casting, rotational molding, thermoforming,
(Continued)

roll lamination, use of a platen/laminate press, and blow molding.

11 Claims, 18 Drawing Sheets

(51) Int. Cl.
*B29C 45/00* (2006.01)
*C09D 175/06* (2006.01)
*B32B 37/00* (2006.01)
*B32B 38/00* (2006.01)
*B32B 38/18* (2006.01)
*B29K 75/00* (2006.01)
*B29K 101/10* (2006.01)
*B29K 105/00* (2006.01)
*B29K 667/00* (2006.01)
*B29C 67/24* (2006.01)

(52) U.S. Cl.
CPC .......... *B32B 37/025* (2013.01); *B32B 38/145* (2013.01); *B32B 38/1808* (2013.01); *C09D 175/06* (2013.01); *B29C 67/246* (2013.01); *B29C 2037/0042* (2013.01); *B29K 2075/00* (2013.01); *B29K 2101/10* (2013.01); *B29K 2105/0005* (2013.01); *B29K 2667/003* (2013.01); *B32B 2038/0076* (2013.01); *B32B 2260/046* (2013.01)

(56) References Cited

U.S. PATENT DOCUMENTS

| | | | |
|---|---|---|---|
| 4,082,634 A * | 4/1978 | Chang | C08F 299/06 428/425.8 |
| 4,643,789 A * | 2/1987 | Parker | B29C 37/0025 156/219 |
| 5,084,353 A | 1/1992 | Cobbledick et al. | |
| 5,490,893 A | 2/1996 | Enlow et al. | |
| 5,498,307 A | 3/1996 | Stevenson | |
| 5,736,090 A | 4/1998 | Yamamoto et al. | |
| 6,117,384 A | 9/2000 | Laurin et al. | |
| 6,235,228 B1 | 5/2001 | Nicholl et al. | |
| 6,245,182 B1 | 6/2001 | Nakamura | |
| 6,623,677 B1 | 9/2003 | Smith et al. | |
| 6,652,983 B1 | 11/2003 | Mori | |
| 7,458,793 B2 | 12/2008 | Toyooka et al. | |
| 7,910,205 B2 | 3/2011 | Wang et al. | |
| 7,927,711 B2 | 4/2011 | Wang et al. | |
| 8,968,618 B2 | 3/2015 | Shapiro et al. | |
| 2002/0168503 A1 | 11/2002 | Dong et al. | |
| 2003/0108675 A1 | 6/2003 | Kawaharada et al. | |
| 2004/0227267 A1 * | 11/2004 | Williams | B29C 45/14688 264/132 |
| 2006/0078745 A1 | 4/2006 | Pudleiner et al. | |
| 2007/0069418 A1 | 3/2007 | Liao et al. | |
| 2008/0095992 A1 | 4/2008 | Hirschfelder et al. | |
| 2010/0167045 A1 | 7/2010 | Schultes et al. | |
| 2010/0196651 A1 | 8/2010 | Liao et al. | |
| 2010/0291329 A1 | 11/2010 | Di Duca | |
| 2011/0120902 A1 * | 5/2011 | Boswell | B65D 65/38 206/524.6 |
| 2012/0315447 A1 | 12/2012 | Ashikaga et al. | |
| 2013/0129992 A1 | 5/2013 | Jahromi et al. | |
| 2014/0113115 A1 | 4/2014 | Ito et al. | |

FOREIGN PATENT DOCUMENTS

| | | |
|---|---|---|
| EP | 1559731 A1 | 8/2005 |
| EP | 0995571 B1 | 6/2013 |
| JP | S6337909 | 2/1988 |
| JP | H1060127 | 3/1998 |
| JP | 11-235753 A | 8/1999 |
| JP | 2008049545 | 3/2008 |
| JP | 2009166287 | 7/2009 |
| WO | 2004101293 | 11/2004 |
| WO | 2012065966 | 5/2012 |
| WO | 2013046743 A1 | 4/2013 |
| WO | 2014025005 | 2/2014 |

OTHER PUBLICATIONS

European Search Report issued in corresponding European application 15798976.5 dated Jan. 22, 2018.
English-language abstract for JP11235753.
Laminate Flooring Specifications and Test Methods, NALFA Standards Publication, LF Jan. 2011, 30 pages.
Laminate Flooring Sustainability Standard, NALFA Standards Publication, LF Feb. 2011, 45 pages.
Underlayment Pad Specifications and Test Methods, NALFA Standards Publication, UL Jan. 2008, 17 pages.
Standard Test Methods for Determining the Biobased Content of Solid, Liquid, and Gaseous Samples Using Radiocarbon Analysis, ASMT International, Designation D6866-12, 14 pages.
Sustainability Assessment for Resilient Floor Coverings, NSF/ANSI 332—2012 48 pages.
UL Greenguard Certification Program, 2013 Brochure, 2 pages.
NALFA Test Labs Listings, 11 pages.
Sustainability Assured for Resilient Floor Coverings, NSF/ANSI 332, 2 pages.
International Search Report and Written Opinion for PCT/US2015/033311 dated Sep. 29, 2015.
English translation of Chinese Office Action for Patent Application No. 201580041738.5, dated Sep. 20, 2018; 14 pages.
English translation of Chinese Search Report for Patent Application No. 201580041738.5; 2 pages.
Abstract of CN101272901(A); dated Sep. 24, 2008; 1 page.
Abstract of CN101564884(A); dated Oct. 28, 2009; 1 page.
Abstract of CN202911434(U); dated May 1, 2013; 1 page.
Office Action dated Apr. 15, 2019 for corresponding European Application No. 15 798 976.5, 3 pages.

* cited by examiner

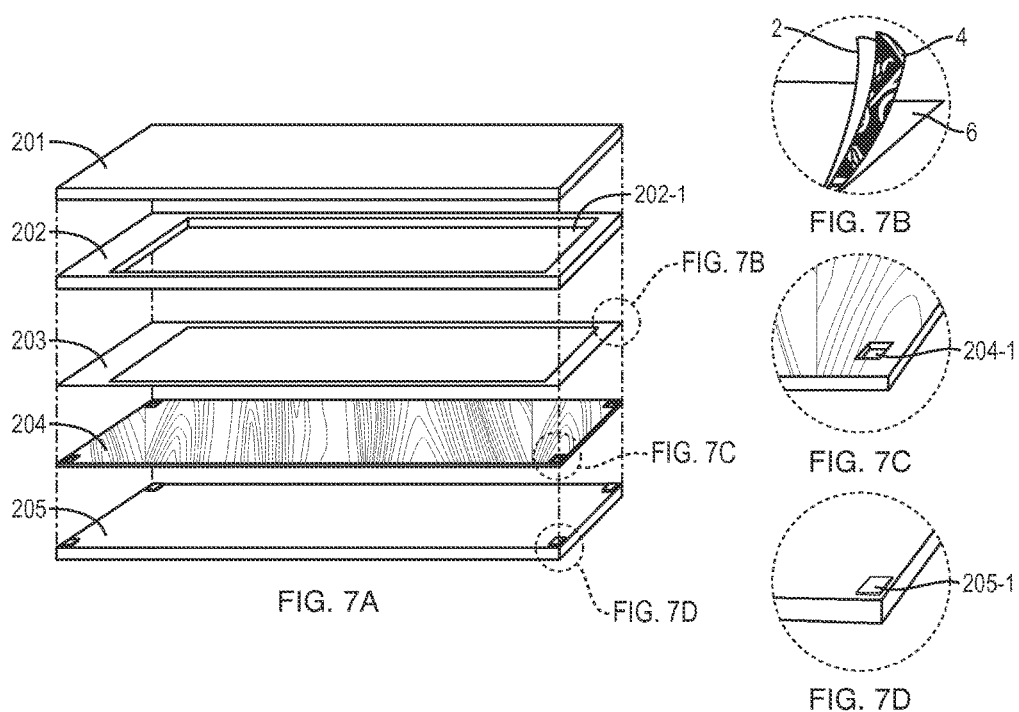
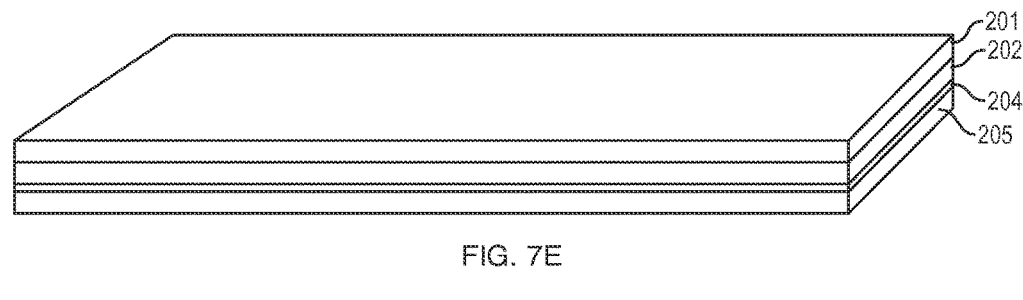
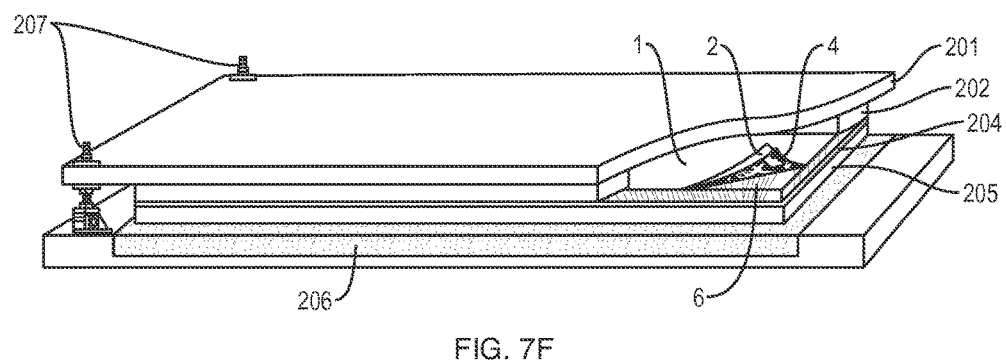

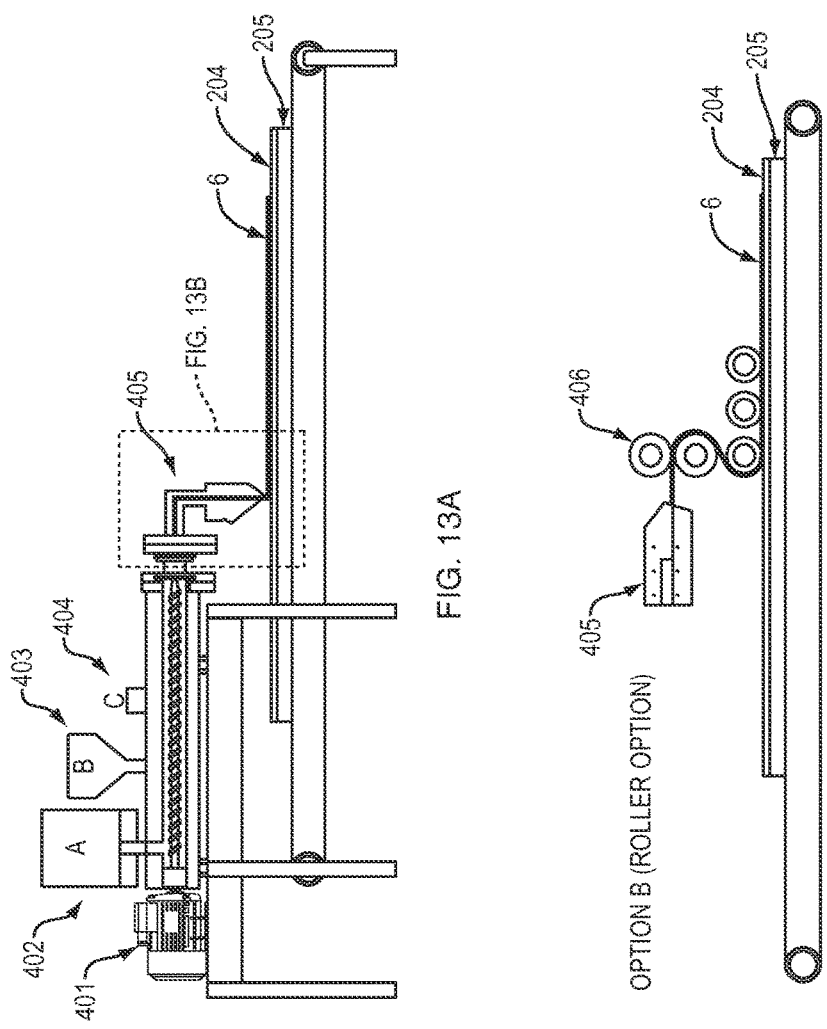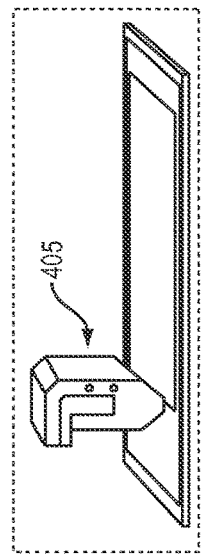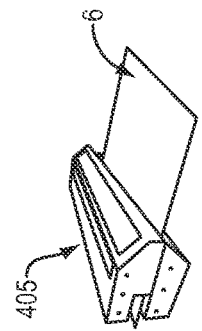

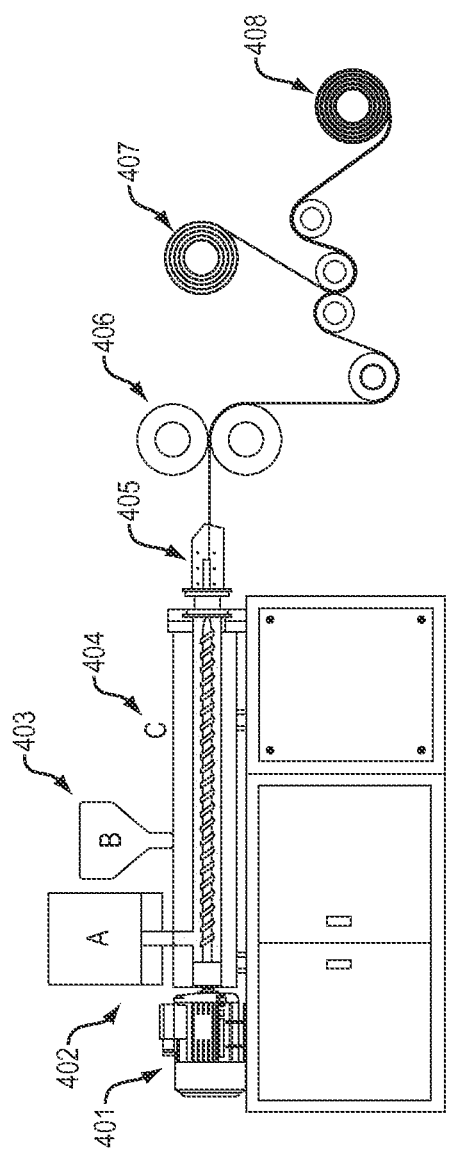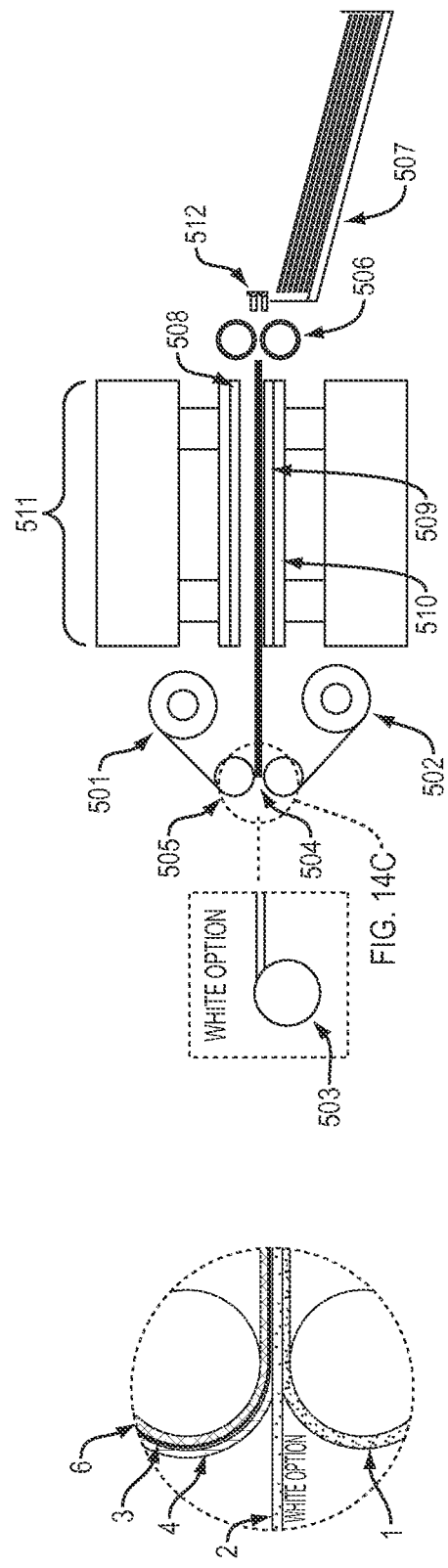
FIG. 14A
FIG. 14B
FIG. 14C

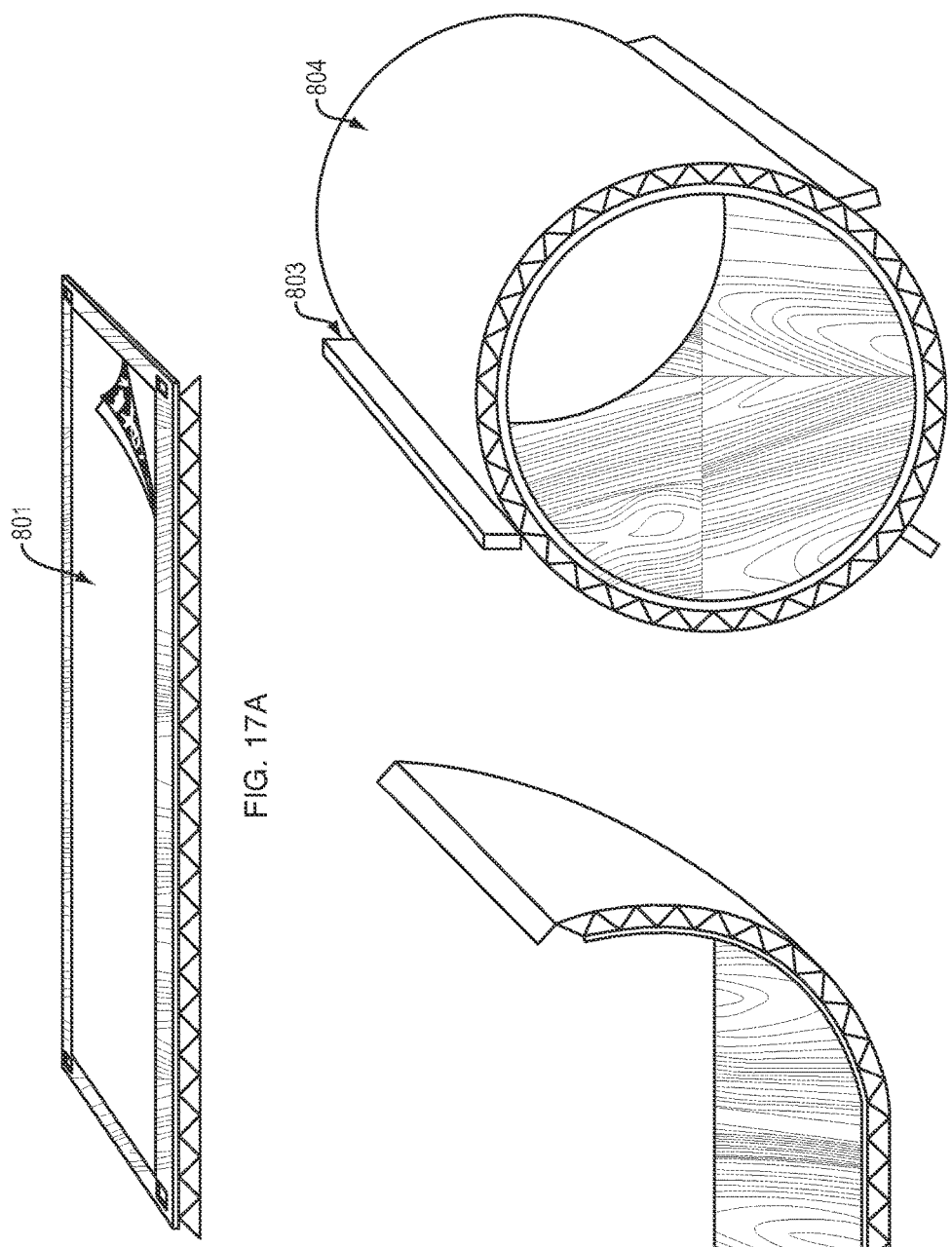

THERMOSET IN-MOLD FINISHING FILM

CROSS-REFERENCE TO RELATED APPLICATIONS

The present application claims priority benefit from U.S. Provisional Patent Application No. 62/005,103, filed May 30, 2014, the entire subject matter of which is hereby incorporated herein by reference in its entirety.

FIELD OF THE INVENTION

This invention relates to the manufacturing of durable thermoset in-mold finishing films (TIMFFs) combining in-mold decorating and in-mold coating capabilities, to molded articles having TIMFFs adhering to their surfaces and both showing a decoration and providing protection, and to thermosetting resin formulations used in the manufacturing of TIMFFs.

BACKGROUND

A. Introduction

In-mold coating (IMC) generally involves the production of a coated molded article by means of a process in which a coating film is inserted into a mold and then a resin is injected into the mold to perform injection molding, thereby transferring the coating resin of a transfer layer provided in the coating film onto a surface of the molded article.

In-mold decorating (IMD) generally involves the production of decorated molded article by means of a process in which a decorative film is inserted into a mold and then a resin is injected into the mold to perform injection molding, thereby decoratively transferring the pattern of a transfer layer provided in the decorative film onto a surface of the molded article.

While injection molding is the most commonly used IMC and IMD fabrication process, alternative processes [such as compression molding, spin casting, rotational molding, thermoforming, roll lamination, use of a platen/laminate press, blow molding, resin transfer molding (RTM), or reaction injection molding (RIM)] are also sometimes used. Injection molding is suitable for processing thermoplastic resins during IMC and IMD operations, while RIM enables the use of injection molding in IMC and IMD processes that require the molding of thermoset polymers.

Most IMD methods are transfer methods where an image is printed on a carrier film and then "transferred" to a molded article during the molding process. Some IMD methods use a carrier film with a durable coating resin that is printed and both the coating and decoration are transferred to the molded article during molding to produce a more durable decoration. (For brevity, in this disclosure, whenever the term "carrier film" is used, it will be understood to encompass both "carrier film" and "carrier sheet".)

The following two subsections review representative examples from the IMC and IMD patent literature. The discussion of this patent literature, which is intended to help teach the invention disclosed in the present filing by providing a context to it, is not meant to imply that these patents necessarily constitute prior art. In fact, it will be seen that most of the patent literature on IMC and IMD processes focuses on the the use of IMC and IMD to incorporate thermoplastic polymer layers, with emphasis on the melt processing of thermoplastics and the design of molds for use in thermoplastic IMC and IMD processes and little or no applicability to thermoset IMC and IMD processes. By contrast, it will be seen also that the patent literature pertaining more specifically to thermoset IMC and IMD processes is rather limited.

The last subsection summarizes some of the limitations of existing IMC and IMD technologies using the RIM process to incorporate a thermoset layer for enhanced durability.

B. Coating Compositions and Processes

U.S. Pat. No. 2,245,651 discloses improved carbon film coatings for molds, and a new method for applying or depositing such films from a smoky flame of acetylene or other hydrocarbon materials for the protective coating of a mold surface in contact with a cast material.

U.S. Pat. No. 5,084,353 discloses that a fiberglass-reinforced plastic can be in-mold coated utilizing a free radical peroxide initiated thermosetting composition of at least one polymerizable epoxy-based oligomer having at least two acrylate groups, at least one copolymerizable ethylenically unsaturated monomer, at least one copolymerizable mono-ethylenically unsaturated compound having a —CO— group and an —NH$_2$, —NH— and/or —OH group, and other conventional components such as at least one zinc salt of a fatty acid, at least one accelerator, at least one filler, and the like. These thermosetting compositions utilize a very low or nil amount of an adhesion agent such as a poly(vinyl acetate) and are stated to achieve better flow and good coverage at reduced coating weights as compared with earlier technologies.

U.S. Pat. No. 5,736,090 discloses a method of in-mold coating using a coating composition including: (A) a vehicle component including (i) a urethane acrylate oligomer or a urethane methacrylate oligomer, which is a reaction product containing no substantial unreacted isocyanate groups, of (a) an organic polyisocyanate, (b) an organic polyol and (c) a hydroxyalkyl acrylate or a hydroxyalkyl methacrylate, and (ii) a polymerizable unsaturated monomer, (B) a polyisocyanate compound, and (C) a polymerization initiator.

Japanese Patent No. JPS6337909 discloses a composition, which is prepared by mixing, for example, pentaerythritol triacrylate, triethylene oxide diacrylate, benzoyl peroxide and silicon-based leveling agent, is applied with a spray gun onto the cavity part, which allows to mold a plate-shaped molded item and is heated at a temperature of 90° C., of an injection mold and left under the state that the air in the cavity part of the mold is displaced with nitrogen gas. The resultant coating is hardened under the state mentioned above. Next, polycarbonate melted at 290° C. is injected in the mold and a molded item is removed from the mold after cooling. The outcome is that a hard and glossy thermoset acrylate film coating possessing good weather resistance is fully and integrally formed onto the outer surface of the polycarbonate molded item.

U.S. Pat. No. 6,235,228 discloses a method for on-mold (a technique that differs slightly from in-mold, as explained therein) surface coating fiberglass-reinforced molded articles during their manufacture with environmentally friendly and physiologically safe thermosetting unsaturated polyester on-mold coating powders which serve as replacements for liquid gel coats. The coating powders employed are adapted to cure at low temperatures to avoid causing thermal damage to the heat sensitive plastic molds which must be reused over and over again, and to cure in the presence of atmospheric oxygen to enable overcoating with liquid fill resins and fiberglass, which constitute the bulk of the finished article, without having the fill resins bleed through the powder coating film and detrimentally affect the overall quality of the surface finish.

U.S. Patent Application No. 2006078745 discloses composite plastic moldings containing A) a thermoplastically formable, heat-resistant composite film having A1) a carrier film of a thermoplastic resin and A2) a layer of a heat-resistant soft touch coating on one side of the carrier film (A1) and B) a thermoplastic layer on the side of the carrier film (A1) facing away from the soft touch coating, wherein the soft touch coating (A2) is obtained from a composition containing i) polyurethanes and/or poly(urethane urea)s which are free from hydroxyl and/or amine groups, ii) ionically modified polyurethanes and/or poly(urethane urea)s which contain hydroxyl and/or amine groups, iii) at least one crosslinking agent, iv) optionally film-forming resins other than A1) or A2), and v) optionally additives. It also discloses a process for the production of these composite moldings and their use in telecommunications equipment and in vehicle, ship and aircraft construction.

U.S. Patent Application No. 2010167045 discloses a reactive mixture for coating moldings via RIM, comprising at least 40% by weight of (meth)acrylates having at least two double bonds, the reactive mixture comprising at least one photoinitiator and at least one thermal initiator. It also describes a coated molding comprising a molding which is obtainable by injection molding processes and comprises at least one polymer selected from the group consisting of poly(methyl methacrylate), polymethylmethacrylimide, styrene-acrylonitrile copolymer, styrene-maleic acid copolymer and poly(methyl methacrylate) copolymers, and a coating which is obtainable by polymerization of (meth) acrylates having at least two double bonds, the coating having an adhesive strength rating of not more than 1 according to the cross-hatch test and a decrease in gloss at 20° C. after a scratch resistance test according to ASTM D1044 (12/05) (applied weight 500 g, number of cycles=100) of not more than 10%. [ASTM D1044-13, "Standard Test Method for Resistance of Transparent Plastics to Surface Abrasion" (2013), which is the current version of this testing standard as of the date of this disclosure, is incorporated herein in its entirety by reference.] The reactive mixture is first thermally cured and, after the thermal curing, cured by irradiation, in a disclosed process for the production of coated moldings. It is shown, by comparing physical examples prepared according to the invention with comparative examples where curing was terminated after thermal cure so that the photocuring step was omitted, that the photocuring step is crucial for obtaining coatings manifesting high scratch resistance.

C. Decorating Compositions and Processes

U.S. Pat. No. 3,379,592 discloses a process for decorating a thermoset article such as dinnerware produced from a melamine-formaldehyde or urea-melamine-formaldehyde resin. This process involves the use, as the decorating medium, of a thermosetting resin ink in which the resin is partially pre-cured prior to the application of the decoration to the surface of the article. The curing process is completed after the application of the decoration.

U.S. Pat. No. 5,498,307 discloses methods for molding parts and for embedding a decorative, instructional or identifying pattern into the surface of molded products during a molding process. In some embodiments of this method, the pattern is formed as a pattern structure which is then applied to the inner surface of a mold. In a rotomolding process according this invention, the mold is charged with casting resin, heated and rotated. The pattern structure is molded into and becomes an integral part of the product.

Japanese Patent No. JPH1060127 discloses that a polyolefin resin (e.g. polypropylene) in an amount of 100 parts by weight is mixed with 5 to 1000 parts by weight of styrenic thermoplastic elastomer (such as a styrene/ethylene/butylene/styrene elastomer), and that the obtained mixture is processed by extrusion, calendering, non-stretched film molding, stretched film molding or the like to obtain a film 1. This film 1 is free from drawbacks inherent in vinyl chloride films, such as blushing and migration of a plasticizer, and can be used as an alternative for the vinyl chloride film. The formation of a pattern layer on the film 1 through a release layer optionally followed by formation of an adhesive layer thereon can provide a decorative sheet possessing excellent design effect, hand, and other properties.

U.S. Pat. No. 6,117,384 discloses an improved process for the manufacture of plastic articles such as automotive light assemblies, and the articles made by this process. The process includes a step wherein one or more colors are decorated onto a single film which is then incorporated with other components in an IMD process to yield the improved articles of the invention. For example, when using this method to manufacture a multi-colored taillight, it is usually preferable to have four discrete layers: (1) a polycarbonate film layer or other transparent substrate, to which a poly (vinylidene fluoride) (PVDF) film is laminated; (2) optionally, a layer of PVDF film or other material resistant to ultraviolet (UV) light; (3) a decorated layer printed on the exposed surface of the polycarbonate layer; and (4) a polycarbonate or other suitable substrate injection molded directly against the decorated layer.

U.S. Pat. No. 6,245,182 discloses a transfer material and surface protecting sheet which can provide a molded article excellent in abrasion resistance and chemical resistance without causing crack in curved part of the molded article. A transfer material or a surface protecting sheet of this invention has a substrate sheet, a protecting printed layer which consists of an active energy ray curable resin composition comprising a polyaddition reaction product having a urethane bond amount of from 6000 to 50000 g/eq as an effective ingredient on a surface of the substrate sheet, and an additional printed layer on the protecting printed layer or on the opposite surface of the substrate sheet.

U.S. Pat. No. 6,623,677 discloses a process for making a decorated article. The process entails printing, using a high temperature ink, a design on a surface of transfer paper, and transferring the design by sublimation to the surface of a clear flat substrate to obtain a decorated substrate. The thus decorated surface is then placed in a mold and thermoplastic resin is injected to form an article. The placing of the decorated substrate in the mold is such that the surface carrying the design faces the inside of the mold. An additional embodiment entails forming the decorated substrate to attain a three-dimensional decorated substrate prior to placing it in the mold. In a specific example, a polycarbonate based composition was used as the injected material and a polycarbonate film was used as the substrate. In another specific example, the substrate was a two-ply laminate of polycarbonate and PVDF.

U.S. Pat. No. 6,652,983 discloses a method for thermoplastic IMD whereby a decorating sheet is set in an injection mold and, after clamping the mold, molten molding resin is injected into the mold and allowed to cool and solidify. A portion of the in-mold decorating sheet becomes integrally bonded to a surface of the molding resin so that a decorated molded resin product is obtained. The decorative sheet has strong adhesion to the surface of the molded resin product over the area where they are integrally bonded, while being sufficiently brittle to enable the easy trimming of any unnecessary portion (any portion which had not become integrally bonded to the surface of the molding resin) from the surface of the molded resin product.

U.S. Pat. No. 7,927,711 discloses a durable layer for in-mold decoration. The durable layer is formed from a composition comprising (i) a thermally crosslinkable and photochemically or radically graftable polymer, (ii) a non-ethylenical thermal crosslinker, and (iii) a radiation curable multifunctional monomer or oligomer. It is stated that the durable layer has excellent surface quality with a wider geometric tolerance and can be formed at low cost.

U.S. Pat. No. 8,968,618 discloses a method of making a molded article having a curved surface, such as plates or serving trays, and the resulting molded articles. The in-mold label is a laminated film that includes a backing layer, a printed surface incorporating one or more designs thereon, a protective film layer, and one or more notches each having adjacent edges separated by a gap of predetermined distance and configured to intersect to ensure conformance of the in-mold label to the angled or curved peripheral portion of the article.

World Patent Application No. WO2004101293 discloses a method of preparing a molded article via IMD. The method includes providing a laminate of a plurality of separate realizable thermoplastic labels superimposed over a carrier film. A decoration is applied in-line to the exposed second surface of the labels, thereby forming a decorated laminate. The decorated laminate is forwarded and indexed into a mold such that the exposed first surface of the carrier film abuts at least a portion of the interior surface of the mold, and the decorated second surface of the label faces the interior space of the mold. A thermoplastic polymer is injected into the mold against the decorated surface of the label, forming a molded article. (Alternatively, RIM can be used to inject the reactive precursors of a thermosetting material such as polyurethane into the mold to form a thermoset molded article.) The carrier film is then separated from the molded article. At least a portion of the surface of the molded article prepared in accordance with the present method is defined by the first surface of at least one label. Molded articles that may be prepared according to this method include identification cards, such as driver's licenses and animal tags (e.g., cattle tags), and lenses, such as tinted ophthalmic lenses and sunshade lenses.

U.S. Patent Application No. 20070184148 exemplifies patents disclosing novel mold constructions to improve the efficiency of thermoplastic IMD processes and to thus achieve lower manufacturing costs and shorter delivery periods. By contrast, mold construction does not appear to have received much attention for thermoset IMD processes.

Japanese Patent No. JP2008049545 discloses a process providing a sheet for decoration which is used when a decorative molding having a fine uneven pattern is produced and can surely form unevenness as designed without deforming or eliminating the fine unevenness not only when the sheet itself is produced but when the sheet is heated or pressurized in the production of the decorative molding, or when the fine uneven pattern is formed in a product in the shape of deep drawing. In this process, in the heat-moldable sheet for simultaneous molding and decoration in which a decorative layer is formed on one side of a base material sheet, the surface on the opposite side of the decorative layer forming surface of the base material sheet is embossed, and the unevenness of the embossed surface is filled with a water soluble resin layer. The water-soluble resin layer is washed away after the removal of the decorated fabricated article from the mold, and the article shows both the decoration and the finely uneven embossed pattern.

U.S. Patent Application No. 20080152855 discloses a composition suitable for the formation of a release layer between the durable layer and the carrier layer in an IMD or thermal transfer printing process, and a process for the formation of a release layer comprising dispersing or dissolving the release layer composition in a solvent followed by curing this composition.

Japanese Patent No. JP2009166287 provides a decorative sheet for a simultaneous molding/decoration apparatus which prevents the use of a pattern having a defect so as to improve the yield of a decorative molding process. This process involves the use of inspection equipment containing a sensor that measures the transmission and reflection of light and thus identifies defects in the transfer layer optically. It then marks the defective portions of the transfer sheet. The use of defective portions of the transfer sheet during simultaneous molding/decoration can thus be avoided by skipping these portions containing defective patterns.

U.S. Patent Application No. 2010196651 discloses an object having a functional element embedded in its top surface and processes for its manufacturing. The object is in general formed by molding, stamping, lamination or a combination thereof. The functional element includes any electrical or mechanical elements that are capable of performing a function.

U.S. Patent Application No. 2010291329 discloses an in-mold label comprising a polymeric or cellulosic carrier base film (1) having a first decorative surface (1a) and a second, backing surface (1b), said label comprising a pattern (3) printed on said first decorative surface (1a) thereof, said printed first surface (1a) being laminated with a transparent protective top film (2), affixed thereto by means of an adhesive (4), the printed pattern (3) being visible through said transparent protective top film (2). It also discloses a method for manufacturing such a label and a method for incorporating it onto the surface of a polymeric article.

World Patent Application No. WO2012065966 discloses a process for overlaying a base substance with a multilayer decorative film in a thermoforming process, preferably in a vacuum forming process, wherein the process comprises the steps of (i) providing a multilayer decorative film comprising a hard coat layer (A), an adhesive layer (D), a base film layer (B) and optionally a design layer (C) between these layers (A) and (D), wherein the adhesive layer (D) comprises at least one latent reactive adhesive, (ii) applying the adhesive layer (D) of the decorative film to the surface of a base substance, and (iii) overlaying the base substance with the decorative film by heating at 70° C. or more. The resulting multilayer decorative films are claimed to have a degree of elongation of 10 to 1000% (preferably 50 to 1000%), a tensile strength of 50 to 1000 kg/cm$^2$, a processing temperature of 70 to 220° C. (preferably 70 to 200° C.), adhesiveness of 50 N/25 mm or more, and durability of 1 week or more at 80° C. and 98% relative humidity.

Chinese Patent No. CN102673293 discloses thermal transfer IMD and a preparation method thereof that enable the high-resolution (600 dots per inch) printing of a PET film sheet, with the possibility of printing continuous patterns and gradient patterns, and color printing with high transparency and high transmittance on the PET back surface. Color saturation is high. The adhesion of a graphic ink layer and a PET film is strong. The decoration can survive high temperatures, can extend while the PET film is extended in a 3D thermal forming process, and has high extension. The extended surface is completed; the ink layer cannot be broken and has no wrinkles. The method not only can realize large-scale continuous production, but it can also overcome the shortcoming that hot-melt resin of the ink coating layer cannot survive high temperatures during the molding process. Products obtained by using the method cannot flush ink and glue and have complete patterns. These patterns manifest high gloss, anti-friction, anti-scratch, and weather resistance, so that they are durable. For example, biaxially oriented PET (BOPET) film was used as the carrier film, an adhesive was formulated, inks of various colors were used to create a pattern, and thermal transfer and injection molding were performed to transfer the pattern onto a PET substrate and to thus obtain a high-resolution printed PET film.

Chinese Patent No. CN102744939 discloses a thermoset IMD film and a preparation method thereof. The IMD film comprises a PET base film whose upper surface is provided with a scratch-resistant thermoset coating layer. An ink adhesion layer is provided on the lower surface of the PET base film. Adhesion of the ink layer on the film layer is provided. The preparation method comprises the steps of performing corona treatment on the PET base film; coating the PET base film; drying the coated PET base film; thermally curing the dried coated PET base film; coating the ink adhesion layer on the back of the cured dried coated PET base film; curing the PET film of which the back is coated with the ink adhesion layer; and rolling and cutting the film. The coating is strengthened by raising the temperature gradually to complete its crosslinking. The resulting thermoset IMD film has high transmittance, flexibility, and adhesion.

World Patent Application No. WO2014025005 discloses a multilayer film which has excellent surface hardness, excellent transparency, small thermal shrinkage, and high brittleness; and which (because it is sufficiently brittle) can be easily trimmed after decorative molding. The multilayer film comprises layer (A) containing a polycarbonate resin having a viscosity average molecular weight in the range of 13,000 to 20,000; and layers (B-1) and (B-2) that are laminated on both surfaces of the layer (A) and contain an acrylic resin. The entire thickness of the multilayer film is 50-200 microns. The thickness of layer (A) is 5-30% of the entire thickness.

U.S. Patent Application No. 2012315447 discloses a label for in-mold molding, which comprises a laminate film comprising a substrate layer (A) and a heat-sealable resin layer (B), wherein the substrate layer (A) comprises a thermoplastic resin in an amount of from 40 to 90% by weight and at least one of an inorganic fine powder and an organic filler in an amount of from 10 to 60% by weight, and the heat-sealable resin layer (B) comprises a thermoplastic resin in an amount of from 50 to 100% by weight.

U.S. Patent Application No. 2014113115 discloses a transfer film for in-mold molding which is stated to be superior in solvent resistance, heat resistance, durability, blocking resistance, and moldability, and is also stated to be capable of suppressing the generation of gate flow; and also provided is a method for producing such a film. The IMD layer of this film is constituted by a mixture composition containing at least one active-energy curable resin and at least one thermosetting resin.

D. Limitations of Existing IMC and IMD Technologies Using RIM

Existing thermoset IMC and IMD technologies that use RIM have several limitations:

(1) A method of decorating with printed images does not currently exist for the RIM process, and, in fact, for any other reactive molding process either. Since IMD is performed by using thermoplastic resins that are transferred to the molded article, this is not a viable method for RIM which uses reactive precursors that cure via exothermic reactions into thermoset resins. IMD for RIM is currently more of an in-mold painting system as it is limited to two-part polyurethane paint that covers over the entire article.

(2) If IMD were possible with RIM, it would be subject to the same issues, such as washout, as seen in IMD for thermoplastic molding methods. Washout is a distorted image due to resin flow and improper ink application and/or formulation.

(3) The white layer presents another potential issue. The resin color of a molded article affects the color of the ink layer. In general, the decoration will be more visible and vibrant if the resin color is lighter. For thermoplastic IMD, white can be printed under the other colors as the ink formulation allows the image to be transferred or bonded to the molded article. The exothermic reaction occurring during the RIM process will not allow a printed image or white layer as only a two-part gel coat which is not compatible with any printable system can be used with existing thermoset IMC and IMD technologies using RIM.

(4) Many IMD systems incorporate a multilayer system where a PET liner carries a printed polycarbonate sheet. The entire sheet bonds to the molded article during the molding process. Then the PET liner separates or releases from the polycarbonate sheet. This is not possible with the RIM process.

(5) While much work has been done to design optimum molds for thermoplastic IMC and IMD, little work has been done to design optimum molds for thermoset IMC and IMD via RIM.

It can be seen from the discussion above that a new combined IMC and IMD technology which alleviates some of these limitations of current thermoset IMC and IMD technologies that use RIM would be a significant development with many potential applications.

SUMMARY OF THE INVENTION

In one aspect, the invention comprises a method for manufacturing an in-mold decorated and in-mold coated thermoset article, said method comprising: (A) placing, on a first carrier film, a printable film comprising a reactive resin and a printable resin, where (i) said reactive resin is a first B-stage resin (binder) and (ii) said printable resin is a second B-stage resin which either is clear or contains an additive that makes it white and opaque; (B) printing an image, pattern, text, indicia, or combination thereof onto said printable resin; (C) placing, on a second carrier film, a durable coating film that is a third B-stage resin, said resin optionally containing an additive, a finish, or a combination or mixture thereof, selected to enhance the durability of the coated surface of the finished article by improving its scratch resistance; (D) combining said printable film on the first carrier film and said durable coating film on the second carrier film into a multilayer laminate film on a roll laminator to thereby form a laminate film; (E) loading said laminate film into a device that assists in the removal of the first carrier film and the second carrier film to thereby form an unsupported laminate film and sets the unsupported laminate film into a mold; (F) filling the mold with an article resin and closing the mold; (G) performing a first stage of the curing that results in a limited reaction and creates a partially crosslinked state and then a second stage of the curing that completes the crosslinking reaction resulting in a decorated and coated article where an integral solid thermoset in-mold finishing film is adhered to the surface of the decorated and coated article; (H) removing the article from the mold; (I) optionally performing a further postcuring step; (J) optionally stacking the articles removed from the mold, optionally performing cutting and/or routing steps, optionally applying further finishes to the surface of the decorated and coated article, and optionally cleaning; and (K) either using on site or crating, packing, and shipping.

In another aspect, the invention comprises a method for manufacturing an in-mold decorated and in-mold coated thermoset article, said method comprising: (A) placing, on a first carrier film, a printable film comprising a reactive resin and a printable resin, where (i) said reactive resin is a first B-stage resin (binder) and (ii) said printable resin is a second B-stage resin which either is clear or contains an additive that makes it white and opaque; (B) printing an image, pattern, text, indicia, or combination thereof onto said printable resin; (C) placing, on a second carrier film, a durable coating film that is a third B-stage resin, said resin optionally containing an additive, a finish, or a combination or mixture thereof, selected to enhance the durability of the coated surface of the finished article by improving its scratch resistance; and (D) combining said printable film on the first carrier film and said durable coating film on the second carrier film into a multilayer laminate film on a roll laminator to thereby form a laminate film. In some implementations of this aspect of the invention, the method optionally further comprises the steps of (E) loading said laminate film into a device that assists in the removal of the first carrier film and the second carrier film to thereby form an unsupported laminate film and sets the unsupported laminate film into a mold; (F) filling the mold with an article resin; and (G) performing a curing reaction.

In yet another aspect, the invention comprises an in-mold decorated and in-mold coated thermoset article composition, said composition being obtained by: (A) placing, on a first carrier film, a printable film comprising a reactive resin and a printable resin, where (i) said reactive resin is a first B-stage resin (binder) and (ii) said printable resin is a second B-stage resin which either is clear or contains an additive that makes it white and opaque; (B) printing an image, pattern, text, indicia, or combination thereof onto said printable resin; (C) placing, on a second carrier film, a durable coating film that is a third B-stage resin, said resin optionally containing an additive, a finish, or a combination or mixture thereof, selected to enhance the durability of the coated surface of the finished article by improving its scratch resistance; (D) combining said printable film on the first carrier film and said durable coating film on the second carrier film into a multilayer laminate film on a roll laminator to thereby form a laminate film; (E) loading said laminate film into a device that assists in the removal of the first carrier film and the second carrier film to thereby form an unsupported laminate film and sets the unsupported laminate film into a mold; (F) filling the mold with an article resin and closing the mold; (G) performing a first stage of the curing that results in a limited reaction and creates a partially crosslinked state and then a second stage of the curing that completes the crosslinking reaction resulting in a decorated and coated article where an integral solid thermoset in-mold finishing film is adhered to the surface of the decorated and coated article; (H) removing the article from the mold; and (I) optionally performing a further postcuring step.

In yet another aspect, the invention comprises a method for manufacturing an in-mold decorated and in-mold coated thermoset article, said method comprising: (A) loading a laminate film into a device, said laminate film comprising a printable film on a first carrier film and a durable coating film on a second carrier film, wherein said device assists in the removal of the first carrier film and the second carrier film to thereby form an unsupported laminate film and sets the unsupported laminate film into a mold; (B) filling the mold with an article resin; (C) performing a curing reaction.

In yet another aspect, the invention comprises a multilayer laminate film comprising: a printable film disposed on a first carrier film, said printable film comprising a reactive resin and a printable resin, where (i) said reactive resin is a first B-stage resin (binder) and (ii) said printable resin is a second B-stage resin which either is clear or contains an additive that makes it white and opaque; and a durable coating film is a third B-stage resin, said resin optionally containing an additive, a finish, or a combination or mixture thereof.

In yet another aspect, the invention comprises an in-mold decorated and in-mold coated molded thermoset article, satisfying the limitations set forth for any of the aspects of the invention cited above, where said article is a solid thermoset elastomer, a rigid thermoset, or a structural foam.

In yet another aspect, the invention comprises an in-mold decorated and in-mold coated molded thermoset article, satisfying the limitations set forth for any of the aspects of the invention cited above, for use in a graphic panel for durable signage and structural graphics, a molded flooring product, a prefabricated housing wall or roof component, a structure or body panel in a transportation vehicle, or any other application for which a thermoset in-mold finishing film can be customized for the in-mold coating and in-mold decoration of a fabricated article.

In yet another aspect, the invention comprises an in-mold decorated and in-mold coated molded thermoset article comprising a single layer of resin selected from the group consisting of polyurethanes, polyureas, poly(urethane urea)s, and combinations or mixtures thereof, wherein the article has a three-dimensional shape with a design integral to the three-dimensional shape, and wherein the design is selected from the group consisting of texture, color, decoration or combination thereof. In some embodiments, the article is selected from the group consisting of graphic panel for durable signage and structural graphics, a molded flooring product, a prefabricated housing wall or roof component, or a structure or body panel in a transportation vehicle. The three-dimensional shape is non-planar in some embodiments and planar in some other embodiments. The design is clear in some embodiments and opaque in some other embodiments.

BRIEF DESCRIPTION OF THE DRAWINGS

The accompanying drawings, which are included to provide further understanding of the invention and are incorporated in and constitute a part of this specification, illustrate embodiments of the invention and, together with the description, serve to explain the principles of the invention.

FIG. 6A illustrates a Table top/clamp method, FIG. 6B illustrates an enlarged view of the Table top of FIG. 6A; and FIG. 6C illustrates a Platen-press method.

FIGS. 7A-7F provides more detailed open and closed views of the mold in FIG. 6A, where FIG. 7A illustrates a series of layers, FIG. 7B illustrates an enlarged view of layer 203, FIG. 7C illustrates an enlarged view of layer 204, FIG. 7D illustrates an enlarged view of layer 205, FIG. 7E illustrates a view of layers 201, 202, 204 and 205 in a compressed position, and FIG. 7F illustrates layers 201, 202, 204 and 205 with detailed features of layer 204.

FIGS. 9A and 9B are a schematic illustration of Stage 1 of the curing process according to an embodiment of the invention in which curing occurs in two stages, wherein FIG. 9A illustrates the Table top/clamp method prior to Stage 1 of the curing process and FIG. 9B illustrates layer 205 during Stage 1 of the curing process.

FIGS. 10A and 10B are a schematic illustration of Stage 2 of the curing process according to an embodiment of the invention in which curing occurs in two stages, wherein FIG. 10A illustrates the Table top/clamp method prior to Stage 2 of the curing process and FIG. 10B illustrates layer 205 during Stage 2 of the curing process.

FIGS. 13A-13D compare some details of embodiments using direct extrusion to a texture plate and embodiments using a roller, wherein FIG. 13A illustrates a device for direct extrusion onto a texture plate, FIG. 13B illustrates a detailed view of extruder 405, FIG. 13C illustrates a roller device and FIG. 13D illustrates a detailed view of the extruder producing sheet 6.

FIGS. 14A-14C show the details of one possible equipment layout that may be used in manufacturing embodiments of the invention by the method described in Example 2, wherein FIG. 14A illustrates an extruder device coupled to a roller 406 and release liners 407 and 408, FIG. 14B illustrates a device for incorporation of a white print and release liner, and FIG. 14C illustrates a detailed view of the white print and release liner option.

FIG. 15A illustrates a screw extruder coupled to a TIMFF extrusion molding die 701, FIG. 15B illustrates a detailed view of the extrusion molding die 701, FIG. 15C illustrates a view of the extrusion molding die 701 with resin filing the mold and FIG. 15D illustrates a product following molding and projected from the extrusion molding die 701.

FIGS. 16A and 16B illustrate a completed in-mold coated and in-mold decorated article that may be manufactured by using the equipment layout shown in FIGS. 15A-15D, wherein FIG. 16A illustrates an in-mold coated and in-mold decorated article projected from the extrusion molding die 701 and FIG. 16B illustrates a completed in-mold coated and in-mold decorated article.

FIGS. 17A-17C show some of the details of yet another possible equipment layout that may be used in manufacturing embodiments of the invention by the method described in Example 2, where FIG. 17A illustrates an extruded coated resin on a flexible texture plate; FIG. 17B illustrates TIMFF and texture plate rolled into a mold and FIG. 17C illustrates TIMFF and texture plate in a tube/pipe mold.

FIG. 18A illustrates a device for making a mold coated and in-mold decorated article with a dispenser system 808, a spin molding chamber 806 and a motor 807 to operate the spin molding chamber, FIG. 18B illustrates a demold graphic tube/pipe, and FIG. 18C illustrates a tube or pipe with TIMFF and decoration.

DETAILED DESCRIPTION OF THE INVENTION

Figure 1:
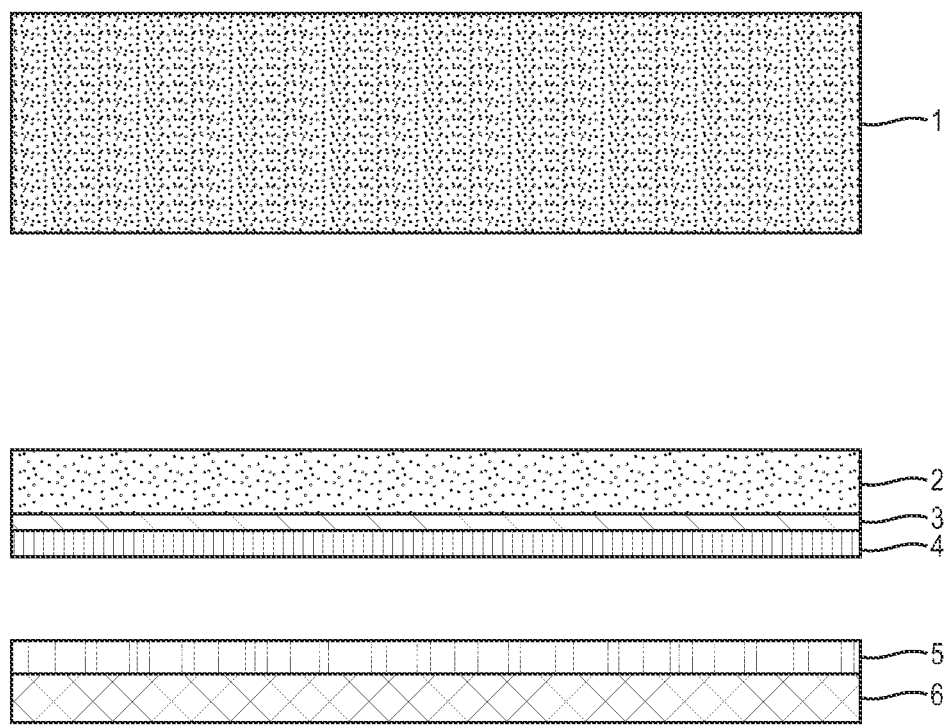
FIG. 1 is a schematic illustration of the sequence in which the components of a non-limiting example of a two-part TIMFF along with an article resin (which may, optionally, contain reinforcements) would be located inside the mold of a RIM apparatus.

While the invention is susceptible to various modifications and alternative forms, specific embodiments have been shown by way of example in the drawings and will be described in detail herein. It should be understood, however, that the invention is not intended to be limited to the particular forms disclosed. Rather, the invention is to cover all modifications, equivalents, and alternatives falling within the spirit and scope of the invention as defined by the appended claims. To that extent, elements and limitations that are disclosed herein, for example, in the Abstract, Summary of the Invention, Detailed Description of the Invention, and Some Envisioned Applications of TIMFF sections, but not explicitly set forth in the claims, should not be incorporated into the claims, singly or collectively, by implication, inference or otherwise.

A. General Features

It is common in the industry to use the term "film" if the thickness does not exceed 10 mils and the term "sheet" if the thickness is greater than 10 mils, where 10 mils=0.254 millimeters. The applicability of the TIMFF technology is independent of the thickness so that it is also independent of any arbitrary distinction based on thickness between a film and a sheet. It should, therefore, be understood that the term "film" has been used throughout this disclosure, for brevity, to cover both "film" and "sheet" as commonly defined in the industry.

For the purposes of this disclosure, a TIMFF is a multi-layer system comprising at least two films; namely, (1) a printable film, and (2) a durable coating film.

The TIMFF technology may be applicable to both IMC and IMD. In certain embodiments, the molding of thermoset resins to form a TIMFF is performed by via reaction injection molding (RIM). In other embodiments, TIMFF fabrication may be performed by using some other process, such as, but not limited to, injection molding, compression molding, resin transfer molding, spin casting, rotational molding, thermoforming, roll lamination, use of a platen/laminate press, and blow molding.

A TIMFF includes at least a printed image and/or solid color in its inner layer that contacts the surface of the molded article and a durable coating as its outer layer that becomes the exposed surface of the molded decorated and coated article. In certain embodiments, the printed image may be formed by printing techniques, such as, but not limited to, digital printing, flatbed printing, UV printing, gravure printing, screen printing, offset printing, offset lithography, inkjet printing, engraving, reprography, thermographic printing, and flexography. As described herein, TIMFF becomes an unsupported film after the carrier films are removed. During the molding process, a TIMFF cures with the molding resin; thus decorating, coating, and becoming a part of the molded article as one integral solid unit. The benefits of placing a TIMFF onto a molded article thus include the decoration as well as protection of the molded article with the TIMFF so that the molded article is enhanced in terms of both its aesthetics and its durability.

A TIMFF offers extreme durability and other outstanding performance characteristics. It can be customized to obtain products that meet different combinations of performance requirements by varying the formulations and process conditions used in the fabrication process, and manufactured into products of varying size and shape by changing the mold.

B-stage resins are used in the formulations of both the printable film and the durable coating film of a TIMFF. For the purposes of this disclosure, a B-stage resin is one in which a limited reaction (e.g., between the resin and a hardener or crosslinking agent) has taken place so that the resin is in a semi-cured state. This partial reaction can occur either at room temperature or at an elevated temperature depending on the formulation. Upon additional heating, irradiation (as non-limiting examples, via UV irradiation or electron beam irradiation), application of pressure, or a combination or sequence thereof, the resin progresses from the B-stage to a fully cured or crosslinked state where it is a solid.

The first, second, and third B-stage resins used in an implementation of the invention can be any thermosetting resins suitable for use in that implementation. These B-stage resins may either be identical to each other in their compositions or possess different compositions. For example, all three of these B-stage resins may be identical in composition, or two of them may be identical in composition while the third resin has another composition, or all three of them may have different compositions. In implementations of the invention using B-stage resins of different compositions, the different compositions must have compatible chemistries; in other words, their formulation ingredients must be capable of curing together into an integral TIMFF manifesting adhesion between the printable film and the durable coating film.

Thermoset resins that can be used in these B-stage resin formulations as well as in the article resin include, but are not limited to, polyurethanes, polyureas, poly(urethane urea)s, polyisocyanurates, polyesters, polyacrylates, polymethacrylates, poly(acrylate methacrylate)s, poly(urethane acrylate)s, poly(urethane methacrylate)s, poly(urethane acrylate methacrylate)s, poly(ester acrylate)s, poly(ester methacrylate)s, poly(ester acrylate methacrylate)s, epoxies, epoxy vinyl esters, cyanate esters, other polyesters that can be synthesized by starting from unsaturated monomers (such as, but not limited to, vinyl ester monomers), epoxy acrylates, epoxy methacrylates, epoxy (acrylate methacrylate)s, silicone acrylates, silicone methacrylates, silicone (acrylate methacrylate)s, glycidyl acrylates, glycidyl methacrylates, glycidyl (acrylate methacrylate)s, polyphenols, novolacs, resoles, phenol-formaldehyde resins, melamine-formaldehyde resins, urea-melamine-formaldehyde resins, urea-formaldehyde resins, urea-phenol-formaldehyde resins, polyimides, polybismaleimides, furan resins, diallyl phthalate, and combinations or mixtures thereof.

In some embodiments, the printable film and the durable coating film are prepared from thermosetting resin formulations belonging to the same polymer family. In some other embodiments, the printable film and the durable coating film are prepared from thermosetting resin formulations belonging to different polymer families. In implementations of the invention using printable film and durable coating film materials of different families, the different families must have compatible chemistries; in other words, the formulation ingredients for the selected families must be capable of curing together into an integral TIMFF manifesting adhesion between the printable film and the durable coating film.

Similarly, the article resin (which may, optionally, contain reinforcements) and the printable film may be prepared either from thermosetting resin formulations belonging to the same polymer family or from thermosetting resin formulations belonging to different but chemically compatible polymer families so that the TIMFF can adhere to the molded article at the interface between the printable film layer and the surface of the molded article.

In some embodiments, some or all of the ingredients of the article resin originate from biobased feedstocks and/or from recycled polymer wastes, providing a more environmentally friendly alternative to a resin derived entirely from fossil fuel based virgin feedstocks.

The formulations used in preparing any of these thermoset resins may optionally further comprise an additional ingredient, such as but not limited to a reinforcing agent, an impact modifier, an antistatic agent, a fire retardant, an antioxidant, a UV stabilizer, a photoinitiator, a thermal initiator, a catalyst, an inhibitor, a buffer, a dispersant, a surfactant, a stabilizer, a compatibilizer, a rheology modifier, a defoamer, a drying agent, a blowing agent, a mold release agent, or any mixture or combination thereof. Optional additional ingredients of each of these types are familiar to workers in the field of the invention.

In some embodiments, the printable resin may be clear or contain an additive that makes it white and opaque. In such an embodiment, the additive may include cellulosic additives, talc [hydrated magnesium silicate, $Mg_3Si_4O_{10}(OH)_2$], titanium white (titanium dioxide, $TiO_2$), ultra-white alumina trihydrate, white glass powder, antimony white ($Sb_2O_3$), barium sulfate ($BaSO_4$), white lead [$(PbCO_3)_2 \cdot Pb(OH)_2$], zinc white (ZnO), zinc sulfide (ZnS), and/or lithopone (a mixture of $BaSO_4$ and ZnS). Titanium white is the most widely used white pigment since it has an extremely high efficiency so that it can provide a white color even when used in a very small amount while not containing heavy metal elements. Some cellulosic fillers, talc, ultra-white alumina trihydrate and white glass powder are advantageous as whitening additives because they are environmentally friendly. In many embodiments of the invention, cellulosic fillers, talc, ultra-white alumina trihydrate, white glass powder, titanium white, and combinations or mixtures thereof will hence be used to make the printable resin white.

In some embodiments, the printable resin may be subjected to corona and/or other surface treatment, will be compatible with standard printing techniques so to place the printed image.

In some embodiments, the carrier film may be a suitable liner material including kraft paper, casting paper, silicone-coated paper, poly(vinyl chloride) (PVC), polyethylene, polypropylene, polystyrene, polyacrylates, polymethacrylates, polycarbonates, polyesters [such as, but not limited to, poly(ethylene terephthalate) (PET), poly(ethylene naphthalate) (PEN), and poly(ethylene furanoate) (PEF)], cellulose acetate, cellulose acetate butyrate, ethyl cellulose, and cellophane are non-limiting examples of liner materials.

Various methods may be used for placing the resin of a printable film and/or the resin of a durable coating film on a carrier film and/or release liner. In one embodiment, non-solvent extrusion of the resin of a printable film and/or the resin of a durable coating film may be used to place such resins on a carrier film and/or release liner. In another embodiment, solvent extrusion of the resin of a printable film and/or the resin of a durable coating film may be used to place such resins on a carrier film and/or release liner. In another embodiment, solvent formulation spray of the resin of a printable film and/or the resin of a durable coating film may be used to place such resins on a carrier film and/or release liner. Solvent mixing and casting, and extrusion mixing and casting, which are two specific non-limiting examples of methods that may be used for placing a printable film or a durable coating film on a carrier film, will be discussed in the section titled EXAMPLES to facilitate the understanding of the practical implementation of the invention. In some embodiments, the method used for placing a printable film on a carrier film and/or release liner may either be the same as or different from the method used for placing a durable film on a carrier film and/or release liner. For example, (a) solvent mixing and casting may be used to place both the printable film and the durable film on their respective carrier films and/or release liners, (b) extrusion mixing and casting may be used to place both the printable film and the durable film on their respective carrier films, or (c) either one of the printable film and durable film may be placed on its carrier film and/or release liner via solvent mixing and casting while the other one is placed on its carrier film and/or release liner via extrusion mixing and casting.

It is important to emphasize, also, that while many implementations of the invention use a carrier film, the use of a carrier film and/or release liner is not a limiting aspect of the invention since many other implementations of the invention do not use a carrier film and/or release liner. For example, a carrier film can be used in some implementations utilizing processes such as roll lamination or molding.

In other embodiments, unsupported film or sheet of B-stage TIMFF can be used or a TIMFF can be placed directly into or onto a mold and/or texture plate and/or pre-pregs. In one embodiment, non-solvent extrusion of the resin of a printable film and/or the resin of a durable coating film may be used to place such resins on a mold and/or texture plate and/or pre-pregs. In another embodiment, solvent extrusion of the resin of a printable film and/or the resin of a durable coating film may be used to place such resins on a mold and/or texture plate and/or pre-pregs. In another embodiment, solvent formulation spray of the resin of a printable film and/or the resin of a durable coating film may be used to place such resins on a mold and/or texture plate and/or pre-pregs. In another embodiment, solvent formulation printing of the resin of a printable film and/or the resin of a durable coating film may be used to place such resins on a mold and/or texture plate and/or pre-pregs. In such embodiments, a thermal print head or piezo print head may be used. In another embodiment, non-solvent formulation printing of the resin of a printable film and/or the resin of a durable coating film may be used to place such resins on a mold and/or texture plate and/or pre-pregs. In such embodiments, a thermal print head or piezo print head may be used.

B. Embodiments Using Reaction Injection Molding and Polyurethane Chemistry

For the purposes of this disclosure, the acronym "PU" will be used from this point on to represent polyurethanes, polyureas, poly(urethane urea)s, and polyisocyanurates. These are closely related types of polymers that can be synthesized by modifying the reactive precursor mixture used in what is commonly referred to in the art as "polyurethane chemistry". In certain embodiments of the invention, the B-stage resins and/or the article resin are based on PU compositions.

As a non-limiting example of PU compositions, the reaction of a hydroxyl group with an isocyanate provides a urethane linkage while the reaction of an amine group with an isocyanate provides a urea linkage. It is well-known to workers in the field of polyurethane materials that polymers with any percentage of urea linkages ranging from 0% to 100% relative to the total amount of urethane and urea linkages can be synthesized via polyurethane chemistry by varying the relative amounts of reactants containing hydroxyl groups and amine groups used to react with an isocyanate. This flexibility of polyurethane chemistry is commonly used by workers in the field as a design variable to fine-tune the performance attributes of a polymer to meet the needs of a targeted application.

Non-limiting examples of reactive precursor mixture ingredients used in polyurethane chemistry include: (a) Polyols (such as the many commercially available polyether polyols, polyester polyols, and polycarbonate polyols; differing in their compositions, average molecular weights, and numbers of reactive functionalities); (b) chain extenders containing hydroxyl reactive groups (such as ethylene glycol, diethylene glycol, 1,3-propanediol, 1,4-butanediol, and 1,6-hexanediol); (c) a chain extender (diethyltoluenediamine) containing amine reactive groups; (d) crosslinkers (such as glycerol and pentaerythritol); (e) aromatic isocyanates [such as the difunctional methylene diphenyl diisocyanate (MDI) and toluene diioscyanate (TDI) and the polymeric MDIs (PMDIs) of higher functionality]; and (f) aliphatic isocyanates [such as methylene dicyclohexyl diisocyanate ($H_{12}$MDI) which is the product of the hydrogenation of the phenyl rings of MDI, isophorone diisocyanate, and 1,6-hexamethylene diisocyanate].

PUs manufactured by using aliphatic isocyanates are known to possess significantly greater resistance to ultraviolet (UV) rays (such as the UV portion of the wavelength spectrum of sunlight) than those manufactured by using aromatic isocyanates. The use of aliphatic isocyanates, therefore, can provide embodiments of the invention that are especially versatile, manifesting excellent durability in outdoors in addition to indoors applications. The following is a more complete list of types of aliphatic isocyanates that are currently known by the inventors to be used in PU formulations: 1,6-hexamethylene diisocyanate (HDI); 1,5-diisocyanato-2-methylpentane; methyl 2,6-diisocyanatohexanoate (lysine diisocyanate methyl ester); bis(isocyanatomethyl)cyclohexane; 1,3-bis(isocyanatomethyl)cyclohexane; 2,2,4-trimethylhexane 1,6-diisocyanate (trimethyl HDI); 2,4,4-trimethylhexane 1,6-diisocyanate (trimethyl HDI); 2,5(6)-bis(isocyanatomethyl)bicyclo [2.2.1]heptane (NBDI); 1,3,3-trimethyl-1-(isocyanatomethyl)-5-isocyanatocyclohexane (IPDI); 1,8-diisocyanato-2,4-dimethyloctane; octahydro-4,7-methano-1H-indenedimethyl diisocyanate (dicylopentadiene diisocyanate); 1,1'-methylenebis(4-isocyanatocyclohexane) (HMDI). The use any of these and other aliphatic isocyanates as well as their mixtures in embodiments is within the scope of the invention.

Many major producers of aliphatic isocyanates are European companies, such as those that are members of the European Aliphatic Isocyanates Producers Association (as of the date of this disclosure, BASF, Bayer MaterialScience, Evonik Industries, and Vencorex France), whose product lines are good starting points in searching for aliphatic isocyanates for use in TIMFF film formulations. It can be seen from the website of this organization that, as of the date of this disclosure, the following were among the major product families offered by these companies: (a) monomeric diisocyanates (with the most readily available products being HDI, IPDI, and HMDI), (b) polyisocyanates (with the most readily available products being HDI trimer, HDI biuret, HDI uretdione, and IPDI trimer), and (c) blocked polyisocyanates (with HDI trimer or IPDI trimer blocked by 2-butanone oxime as representative products). Without limiting the generality of the invention, one way of obtaining B-stage PU film formulations where curing to different levels in different stages happens thermally and the final cured films have the desired mechanical properties is to use an optimized mixture of unblocked and blocked aliphatic isocyanates.

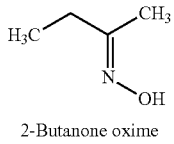

2-Butanone oxime

Polyurethane prepregs developed by Evonik and using aliphatic isocyanates (described in an article titled "Polyurethane Prepregs—A New Concept for CFRP Processing") may provide another formulation option in developing B-stage PU film formulations for the manufacture of embodiments of the invention.

The formulations used in polyurethane chemistry also often include one or more types of additives, such as, but not limited to, any one or combination of the following: (a) A catalyst (such as a tin-based catalyst or a tertiary amine catalyst); (b) a surfactant (for example, a surfactant with defoaming performance characteristics if a solid non-porous bubble-free product is desired); and/or (c) a blowing agent (in formulations where a foam product is desired).

Specific non-limiting examples of polyol and isocyanate product grades as well as other formulation ingredients used in the experimental work performed up to the date of this disclosure will be listed in the EXAMPLES section to facilitate the teaching of the invention.

A TIMFF is a multilayer system comprising two films. The two films of a TIMFF system are (1) a printable film and (2) a durable coating film.

In one embodiment, FIG. 1 is a schematic illustration of the sequence in which the components of a non-limiting example of a two-part TIMFF along with an article resin (which may, optionally, contain reinforcements) would be located inside the mold of a RIM apparatus. The following notation is used: 1: PU-type article resin which would be in contact with the top mold surface, 2: clear or white reactive (B-stage) PU resin that accelerates and/or assists the bonding of the TIMFF to the article resin as well as providing a surface to be printed upon, 3: optional corona and/or other surface treatment for component 2 to enhance its printability, 4: digital print or gravure UV ink or treated print layer (the decoration) placed on the surface of the print base layer 2 or on the optionally treated surface 3 of the print base layer, and 5: reactive (B-stage) PU resin that accelerates and/or assists in the bonding of the decorated print layer to the durable coating film 6 (such as an automotive-grade PU or PU/acrylate hybrid or fluoropolymer hardcoat layer) which would be in contact with the bottom mold surface. The bottom mold surface sets the finish and the texture as its platen face has finish textures and patterns appropriate for the article that is being manufactured.

Figure 2:
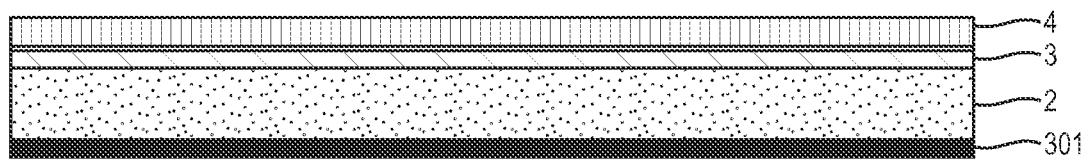
FIG. 2 is a schematic illustration of additional details of a non-limiting embodiment of the print (decoration) film component of a TIMFF.

FIG. 2 is a schematic illustration of additional details of a non-limiting embodiment of the print (decoration) film component of a TIMFF. The following notation is used: 2: clear or white reactive (B-stage) PU resin that accelerates and/or assists the bonding of the TIMFF to the article resin as well as providing a surface to be printed upon, 3: optional corona and/or other surface treatment for component 2 to enhance its printability, 4: digital print or gravure UV ink or treated print layer (the decoration) placed on the surface of the print base layer 2 or on the optionally treated surface 3 of the print base layer, and 301: poly(ethylene terephthalate) (PET) release liner that serves as the carrier film for both a reactive bonding resin layer and a reactive printable resin layer.

In FIGS. 1 and 2, a reactive PU bonding resin is a B-stage binder that begins crosslinking as it reacts to the exothermic reaction of the mold resin as it is injected into the mold. PU is a non-limiting example of a family of resins, suitable for use as binder resins, where the processing behavior as well as the end use performance characteristics can be varied over broad ranges by modifying the reactive precursor mixture used in polyurethane chemistry to meet different application requirements.

Figure 3:
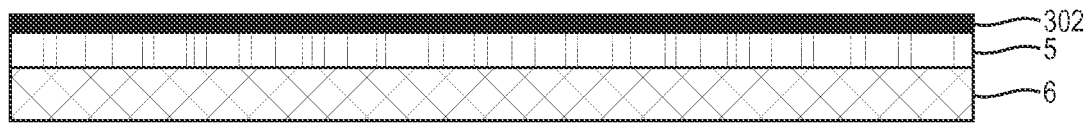
FIG. 3 is a schematic illustration of additional details of a non-limiting embodiment of the durable coating film component of a TIMFF.

FIG. 3 is a schematic illustration of additional details of a non-limiting embodiment of the durable coating film component of a TIMFF. The following notation is used: 302: PET release liner that serves as the carrier film for the coating film, 5: B-stage reactive PU bonding resin layer formulated to impregnate the printable resin during lamination and to crosslink with it during molding, and 6: a PU or PU/acrylate hybrid or fluoropolymer hardcoat layer optionally containing additives and/or finishes selected to further enhance the durability of the coated surface. As a non-limiting example, the additive aluminum oxide can be used to provide an extremely durable finish to laminate floor panels by enhancing the scratch resistance of the coated surface.

Figure 4:
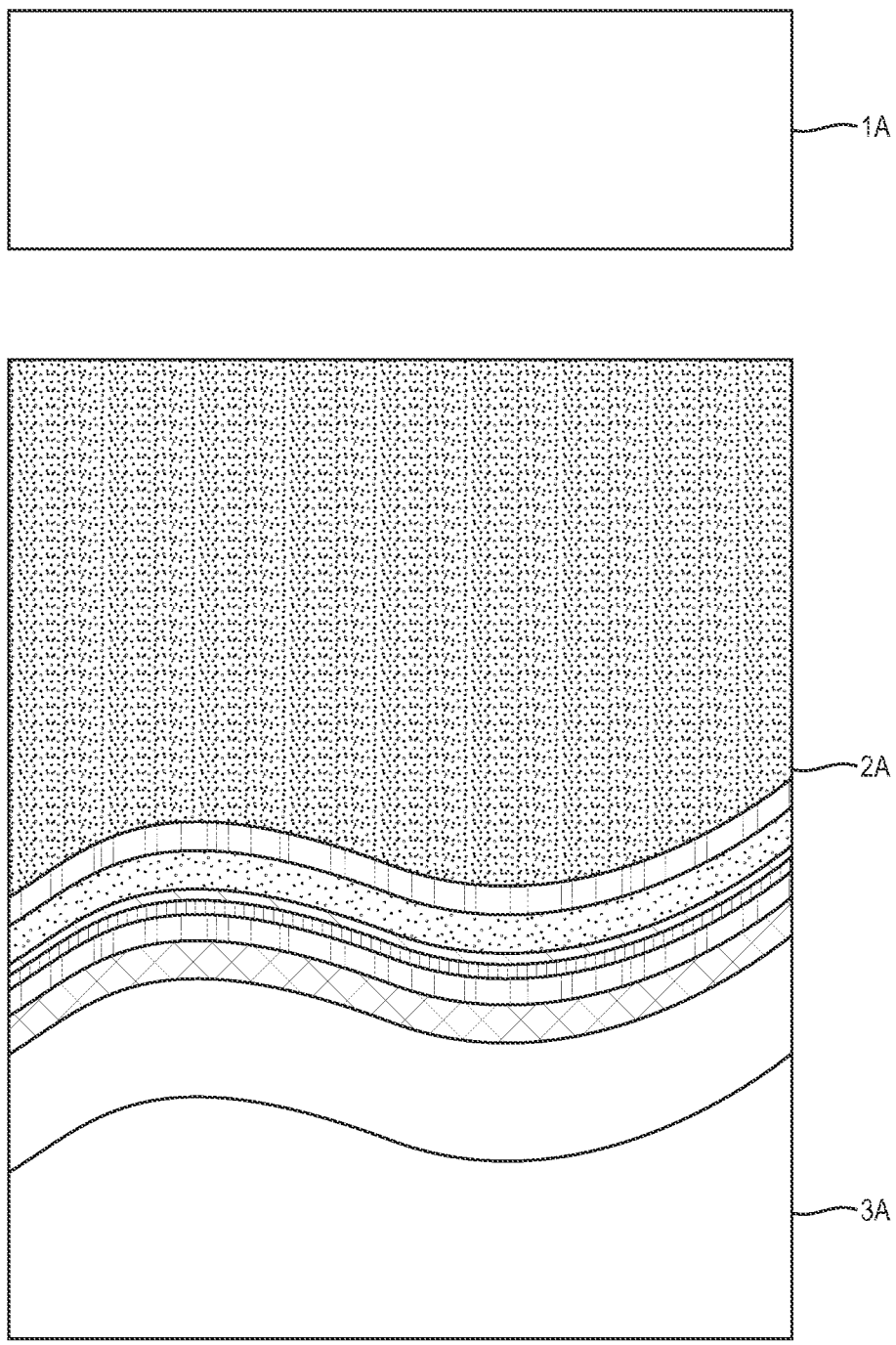
FIG. 4 is a schematic illustration of the integrally bonded molded article and the TIMFF of FIG. 1 after the completion of the molding process.

FIG. 4 is a schematic illustration of the integrally bonded molded article and the TIMFF of FIG. 1 after the completion of the molding process. Here, 1A and 3A represent the top and bottom halves of the open mold respectively. Note that, in this particular non-limiting example, the bottom half of the mold has a curved shape which has been imparted to the molded article. The molded article and the TIMFF are integrally bonded to each other at the interface 2A.

Figure 5:
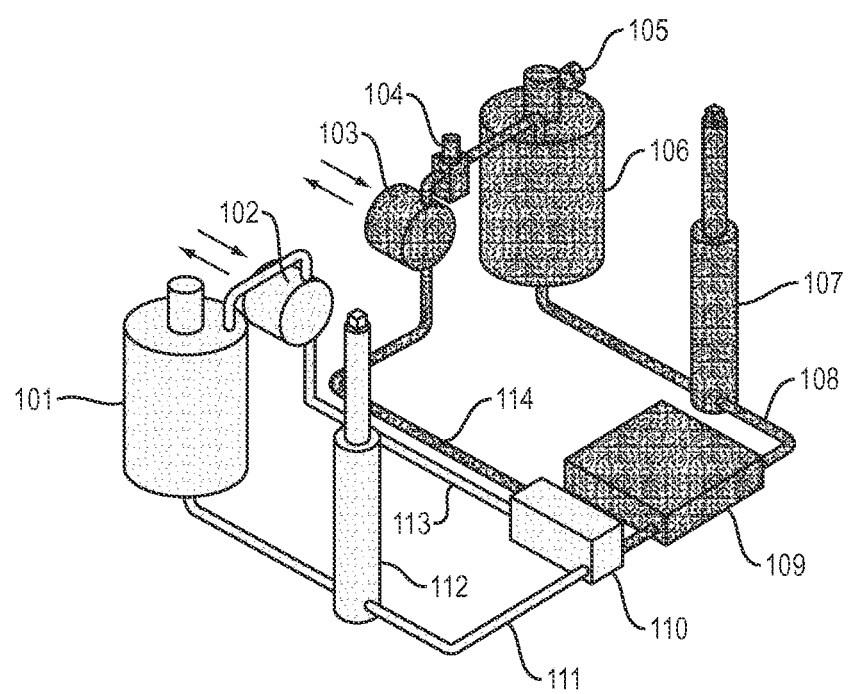
FIG. 5 is a schematic illustration of a non-limiting example of the mix and dispenser system of a RIM apparatus that may be used in the manufacturing process.

C. Reaction Injection Molding Apparatus and In-Mold Curing Process Occurring Therein FIG. 5 is a schematic illustration of a non-limiting example of the mix and dispenser system of a RIM apparatus that may be used in the manufacturing process. The following notation is used: 101: isocyanate feed tank, 102: isocyanate heat exchanger, 103: polyol heat exchanger, 104: nucleator, 105: stir motor, 106: polyol feed tank, 107: polyol metering piston and recirculation pump, 108: polyol supply line, 109: filler mix module, 110: recirculation mix head, 111: isocyanate supply line, 112: isocyanate metering piston and recirculation pump, 113: isocyanate return line, and 114: polyol return line.

Figure 6A:
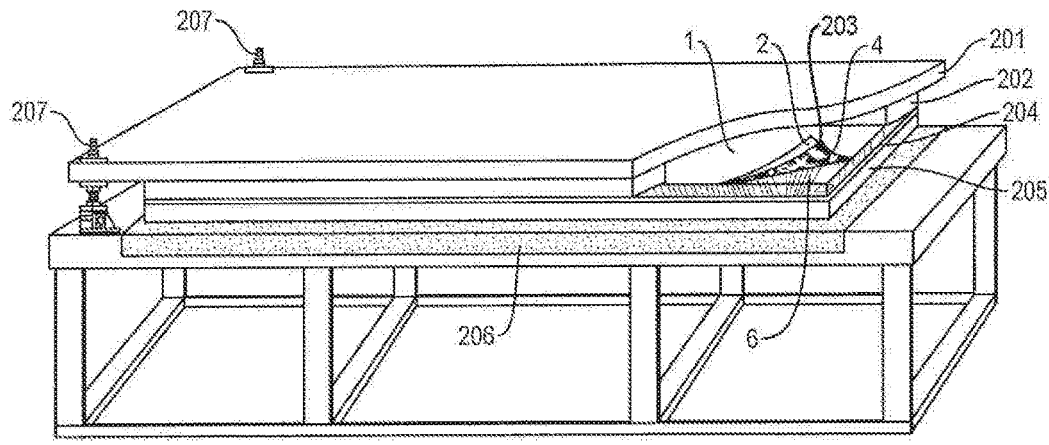
FIGS. 6A-6C provide schematic illustrations of two non-limiting examples of the mold system of a RIM apparatus that may be used in the manufacturing process.
Figure 6B:
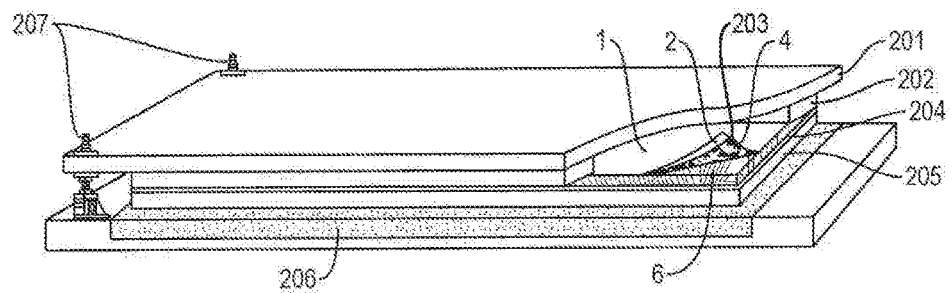
Figure 6C:
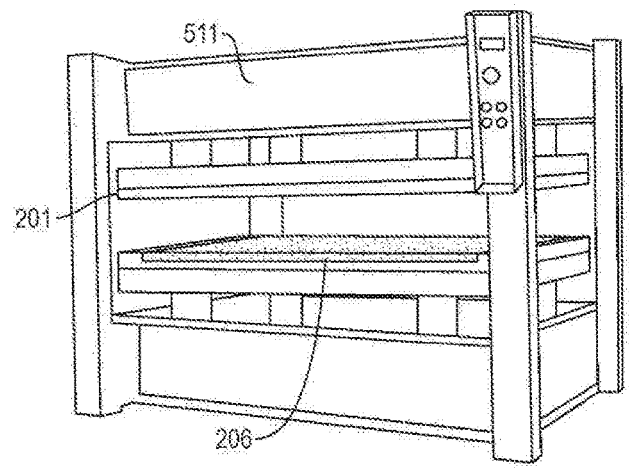

FIGS. 6A-6C provide schematic illustrations of two non-limiting examples of the mold system of a RIM apparatus that may be used in the manufacturing process. (a) Table top/clamp method. (b) Platen-press method. The following notation is used: 201: top mold, 202: spacer (or gap) ring, 203: TIMFF film, 204: registration system (may optionally be a texture plate in some non-limiting embodiments), 205: bottom mold, 206: mold heater, 207: mold open/close actuator, and 511: frame of platen press in the example of the platen-press method. In both examples, the mold system combines three features. Firstly, the height of the top mold surface is adjustable to enable the fabrication of molded articles of different thicknesses. Secondly, the entire mold can optionally be tilted to some angle (such as, but not limited to, a tilt of 20° C.) to facilitate the filling of the mold with resin. Thirdly, variable finish textures and designs appropriate for the article that is being manufactured can be placed on the platen face of the bottom surface of the mold and thus imprinted on the exposed surface of the in-mold decorated and in-mold coated molded article.

FIGS. 7A-7F provide more detailed open (a) and closed (b) views of the mold in FIG. 6. The following additional notation is used: 202-1: open area of spacer (or gap) ring, where the mold resin and reinforcements are injected, with the depth of the ring determining the thickness of the panel; 204-1: pin register hole; 205-1: and pin that registers into hole 204-1.

Figure 8:
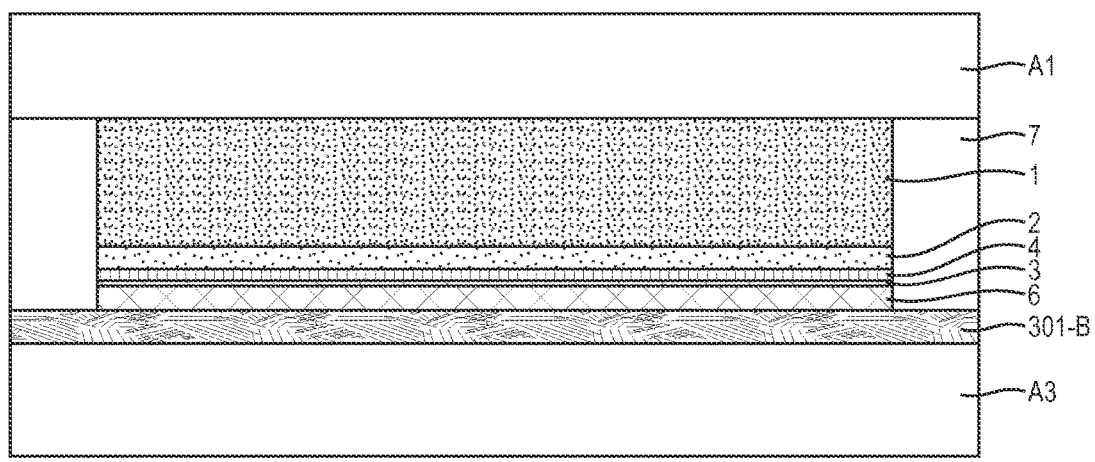
FIG. 8 provides a detailed closed-panel view of the mold in another embodiment of the invention.

FIG. 8 provides a detailed closed-panel view of the mold in another embodiment of the invention. Most of the notation shown in this drawing was described in the context of FIG. 1. The following additional notation is used: (301-B): texture plate, (7) spacer ring, (A1) top mold, and (A3) bottom mold which also provides the ability to heat and cool during in-mold cure. In some embodiments of the invention, the curing that occurs during the RIM process during fabrication occurs in a single continuous stage to create a fully crosslinked state of the unsupported laminate film and the article resin.

In some other embodiments of the invention, the curing that occurs during the RIM process can be summarized in terms of two stages (Stage 1 and Stage 2). In such embodiments, a first curing reaction condition prevails during Stage 1 and creates a partially crosslinked state, and then a second curing reaction condition prevails during Stage 2 to create a fully crosslinked state of the unsupported laminate film and the article resin. It should be remembered, in this context, that a B-stage resin is already partially cured; in other words, it is partially crosslinked relative to the starting formulation ingredients. Hence the curing that occurs during Stage 1 to create a partially crosslinked state refers to the further advancement of the extent of crosslinking starting from a state of the film where it is already partially crosslinked, to move further towards the fully cured state, which, however, is not reached until the end of Stage 2.

Figure 9A:
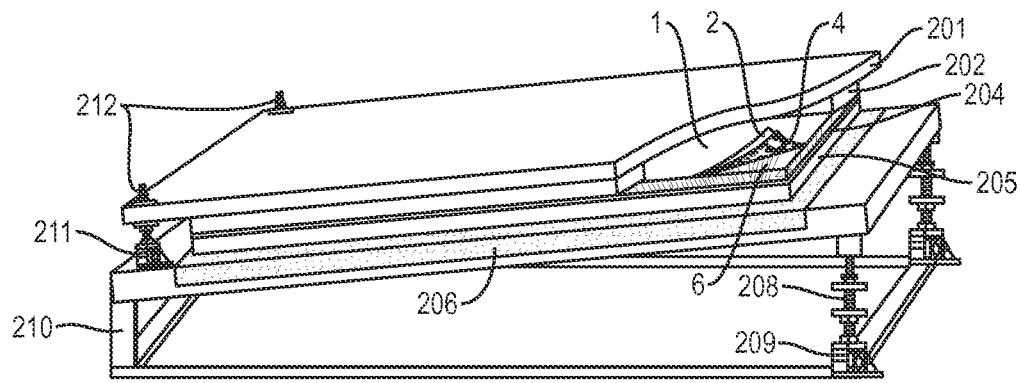
Figure 9B:
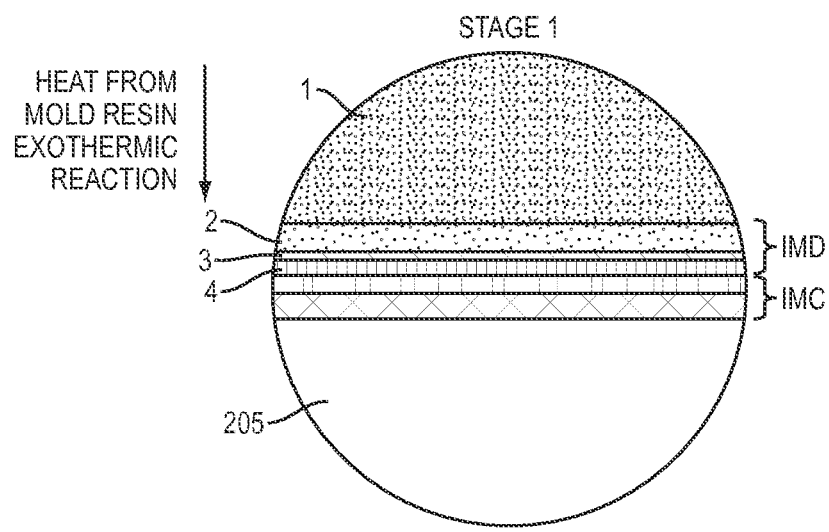

In one such embodiment where the curing occurs in two stages, Stage 1 cure begins as the exothermic reaction from the mold resin causes the reactive resin to crosslink. This crosslinking continues across the TIMFF and down into approximately 40% to 60% of the printable resin. There may be a need to release gases from the mold via a gas release valve during the Stage 1 cure. This understanding of the Stage 1 cure is further illustrated schematically in FIGS. 9A-9B. As shown in this example, the entire mold can optionally be tilted to some angle (such as, but not limited to, a tilt of 20° C.) to facilitate the filling of the mold with resin. Most of the notation has been introduced in FIGS. 1 and 6A-6C. The following additional elaborations are useful in in understanding this drawing: 1: PU-type article resin which would be in contact with the top mold surface, 2: clear or white reactive (B-stage) PU resin that accelerates and/or assists the bonding of the TIMFF to the article resin as well as providing a surface to be printed upon, 3: optional corona and/or other surface treatment for component 2 to enhance its printability, 4: digital print or gravure UV ink or treated print layer (the decoration) placed on the surface of the print base layer 2 or on the optionally treated surface 3 of the print base layer, 205: bottom mold, IMD: in-mold decoration layers of the TIMFF, and IMC: in-mold coating layers of the TIMFF. Also the following additional notation is used: 208: screw with adjustable height; 209: screw motor; 210: hinge leg (fixed height); and 211: four motor clamps that raise and lower the top mold to allow positioning of the bottom mold, texture plate, TIMFF, and spacer ring as well as closing the mold with pressure adequate for RIM/RTM. When the article resin 1 is injected into the mold and starts to cure, the exothermic reaction releases heat and causes pressure in the mold. Any gas generated as a result of this exothermic reaction is released through a valve. The reactive bonding PU resin in component 2 acts as an accelerator for the curing of this clear or white print base layer. The digital print or gravure UV ink or treated paint layer 4 placed either directly on component 2 or optionally on the treated surface 3 of component 2, was cured previously when the film was printed. The IMD layers are cured mainly during the exothermic heat cycle of Stage 1 while the IMC layers will be cured mainly during the platen heat cycle of Stage 2 described below.

Figure 10A:
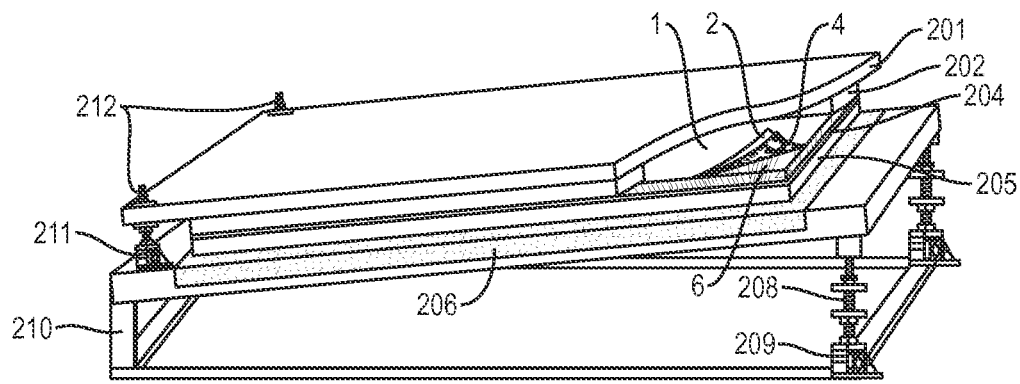
Figure 10B:
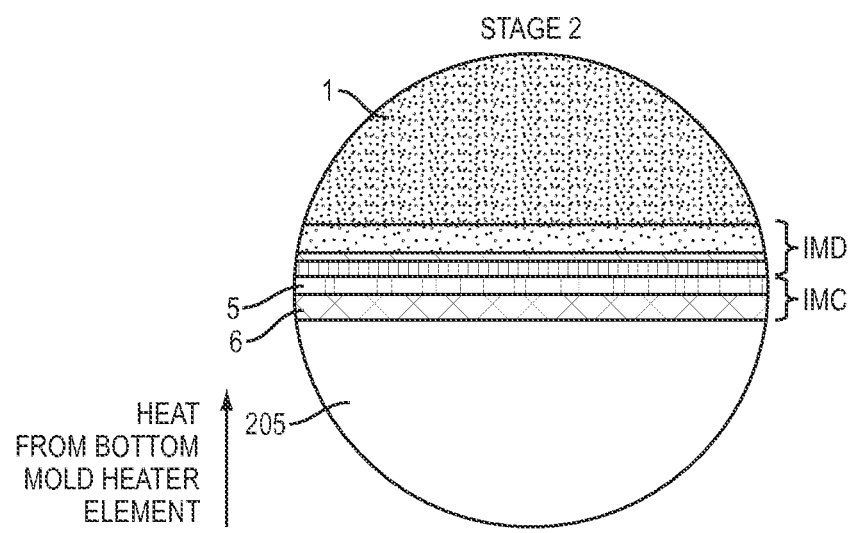

In such an embodiment, Stage 2 cure begins, approximately in the middle of the Stage 1 cure, when the bottom mold heater turns on and starts the Stage 2 cure. Optionally the pressure may be increased during the Stage 2 cure. Curing continues until the resins in the molded article and in the TIMFF have all cured completely. After the completion of the Stage 2 cure, the mold cools and then opens for article removal. The reaction injection molded article is now complete, with an ultra-durable IMD. This understanding of the Stage 2 cure is further illustrated schematically in FIGS. 10A-10B. Most of the notation has been introduced in FIGS. 1 and 6A-6C. The following additional elaborations are useful in understanding this drawing: 1: PU-type article resin which would be in contact with the top mold surface, 5: reactive (B-stage) PU resin that accelerates and/or assists in the bonding of the decorated print layer to the durable coating film 6 (such as an automotive-grade PU or PU/acrylate hybrid or fluoropolymer hardcoat layer) which would be in contact with the bottom mold surface 205, IMD: in-mold decoration layers of the TIMFF, and IMC: in-mold coating layers of the TIMFF. The IMD layers had been cured mainly during the exothermic heat cycle of Stage 1 while the IMC layers are cured mainly during the platen heat cycle of Stage 2. More specifically, the bottom mold 205 is heated by a platen heater attached to it. This heat activates the reactive PU bonding resin layer 5 and accelerates the curing of the PU or PU/acrylate hybrid or fluoropolymer hardcoat layer 6.

The platen and the mold are then cooled by a cold water cycle run through them after the curing of the resins is completed.

The manufacturing process of the invention, described in detail above by considering a class of non-limiting exemplary embodiments, enables the fabrication of simultaneously in-mold decorated and in-mold coated thermoset articles, greatly reducing the secondary finishing costs.

D. Embodiments Incorporating Biobased and/or Recycled Formulation Ingredients

D.1. Introduction

In some non-limiting embodiments of the invention, the article resin that the mold fills with comprises (a) ingredients obtained or derived from biobased feedstocks, or (b) ingredients obtained or derived from recycled polymer wastes, or (c) combinations or mixtures thereof; with any of these families (a), (b), and (c) of embodiments providing a more environmentally friendly alternative to a resin derived entirely from fossil fuel based virgin feedstocks.

D.2. Use of Biobased Feedstocks

From a sustainability perspective, it is preferable to incorporate as high biobased content as possible. However, the performance of many products starts to decline at high biobased contents because of the limitations of the biobased building blocks for polymers available as of the date of this disclosure. It is anticipated that the biobased content that can be incorporated into many products without causing a deterioration of the performance of the product will increase gradually over time since the extraction and/or derivation of new and improved building blocks for polymers from biobased feedstocks is a very active area of research and development.

A manufacturer that knows what percentage of each ingredient in the formulation of its product originated from a biobased source (as indicated by the supplier of each formulation ingredient) can use this information to calculate theoretical biobased content for the product.

More generally, ASTM D6866-12, "Standard Test Methods for Determining the Biobased Content of Solid, Liquid, and Gaseous Samples Using Radiocarbon Analysis" (11 May 2012), can be used to measure the biobased content of any product containing carbon-based components that can be combusted in the presence of oxygen to produce carbon dioxide ($CO_2$) gas. Hence ASTM D6866-12 provides a quantitative experimental estimate of the biobased content of any product containing carbon-based components. ASTM D6866-12 is incorporated herein in its entirety by reference. Since test methods continue to be improved, it is understood that ASTM D6866-12 may someday be superseded by an updated or new standard.

If at least 10% of the article resin that the mold fills with is derived from biobased feedstocks, the manufacturing process will henceforth be referred to as Custom Bio-Composite—Reaction Injection Molding (CBC-RIM). (The qualifier "Custom" highlights the fact that the formulations used in implementing the process of the invention can be customized to meet the requirements of many different applications.) On the other hand, if the biobased content of the article resin that the mold fills with is less than 10%, then the manufacturing process will be referred to as Custom Composite—Reaction Injection Molding (CC-RIM). If the article resin contains reinforcements, then these processes will instead be referred to as Custom Bio-Composite—Reinforced Reaction Injection Molding (CBC-RRIM) and Custom Composite—Reinforced Reaction Injection Molding (CC-RRIM) respectively. The biobased content of the article resin that the mold fills with is at least 40% in some other embodiments and at least 70% in yet some other embodiments.

The following are some non-limiting examples of biobased formulation ingredients that were commercially available as of the date of this disclosure for use in polyurethane chemistry: Agrol™ natural oil-based polyols available in a range of functionalities from BioBased Technologies, BiOH™ soy-based polyols from Cargill, RENUVA™ natural oil-based polyols from Dow Chemical, bio-succinic acid-based linear (functionality=2) and branched (functionality=2.4 or 2.7) polyester polyols from Myriant, Priplast™ biobased polyester polyols from Croda, Cerenol™ polyether diols (made with renewably sourced corn-based 1,3-propanediol) from DuPont, various biobased ingredients (binder, polyol, and resin) from Vandeputte Oleo, Sovermol™ biobased polyols from BASF, EMEROX™ biobased polyols from Emery Oleochemicals, and Tolonate™ X FLO 100 partially biobased solvent-free low-viscosity aliphatic isocyanate (1,6-hexamethylene diisocyanate) polymer from Vencorex.

D.3. Use of Feedstocks Originating from Recycled Polymer Wastes

In some non-limiting embodiments, at least 5% by weight of the article resin that the mold fills with is derived from recycled polymer wastes. In some other non-limiting embodiments, at least 20% by weight of the article resin that the mold fills with is derived from recycled polymer wastes.

Recycled polymer wastes may comprise polymer manufacturing process wastes, post-consumer polymer wastes, and mixtures thereof, which would otherwise probably have gone to a landfill or an incinerator. As non-limiting examples, processes exist for the chemical depolymerization of products such as post-consumer PET bottles and PU foams into oligomers which can then be converted into PU precursors (such as polyols).

The following are some non-limiting examples of formulation ingredients derived from polymer wastes that were commercially available as of the date of this disclosure for use in polyurethane chemistry: TERRIN™ aliphatic polyester polyols containing a minimum of 50% recycled content from INVISTA, Recyclopol™ polyether polyols from Polymer Research technologies, and InfiGreen™ polyols derived by processing scrap polyurethane foam from InfiChem Polymers LLC (this company was recently acquired by Emery Oleochemicals).

E. Manufacturing Process Production Flow

Figure 11:
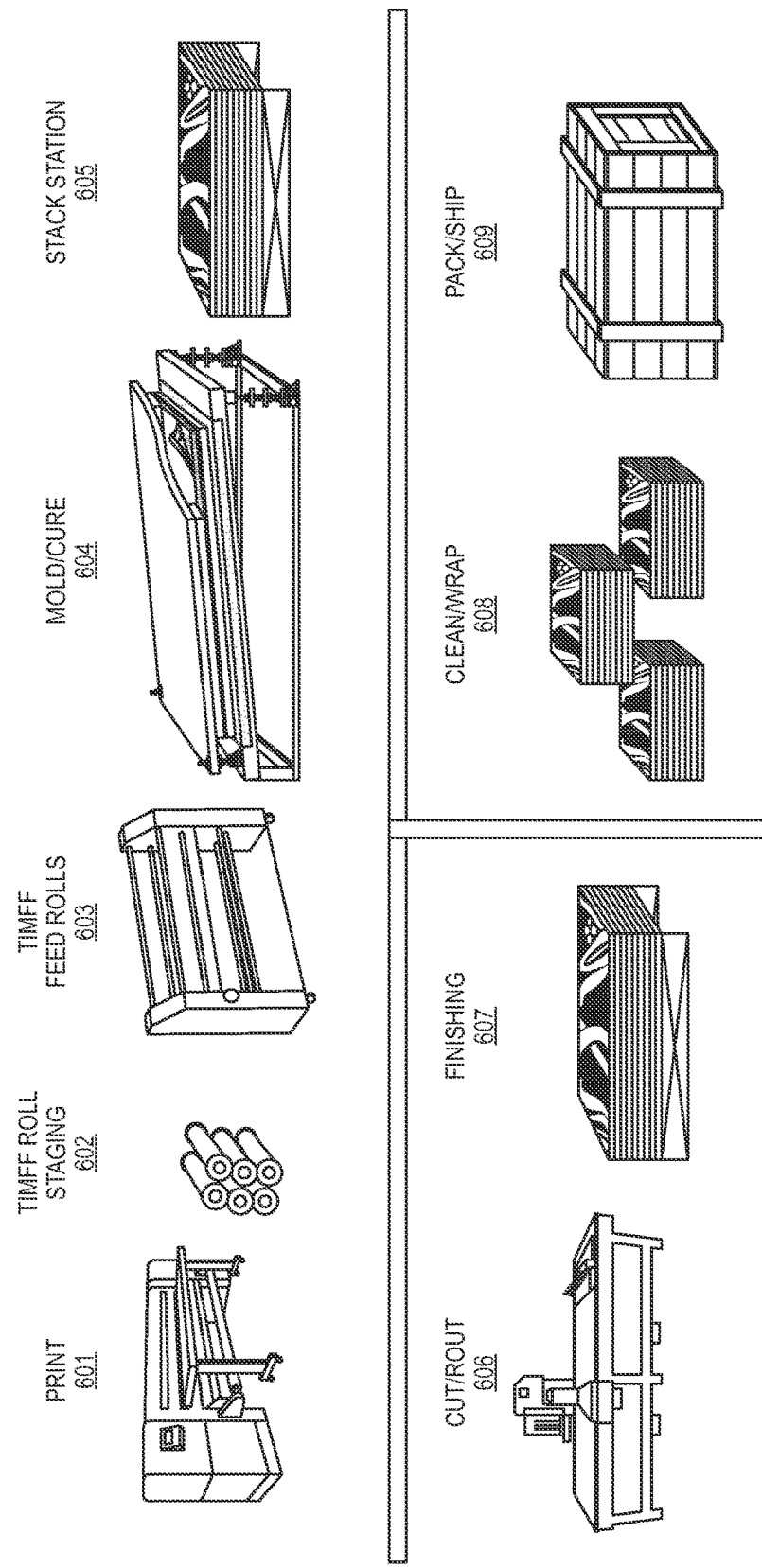
FIG. 11 is a schematic illustration of the thermoset in-mold finishing film (TIMFF) and reaction injection molding (RIM) production flow according to an embodiment of the invention.

FIG. 11 provides a schematic illustration of the thermoset in-mold finishing film (TIMFF) and reaction injection molding (RIM) production flow according to an embodiment of the invention. Films are printed (601) and combined by a roll laminator (602). After lamination, the film is loaded into a device (603) that assists in the removal of the liners and sets the unsupported film into the mold (604). (In some non-limiting embodiments, the mold closes and the registration bars hold the TIMFF in place. In some other non-limiting embodiments, the film can be pre-molded or held in place in the mold with variable methods for different types of molding.) The mold fills with a resin, and Stage 1 and Stage 2 cure take place. Fabricated articles are then stacked (605), cut/routed (606), finished (607), cleaned and crated (608), and packed and shipped (609).

While roll lamination is a possible sub-process that helps in handling the film in some implementations of the invention, some other implementations comprise extrusion of B-stage film or sheets on a mold followed by setting the entire mold and film into a printer and then moving them again for molding as the final process step. In such implementations, the textured mold acts as a chiller for the molten TIMFF before printing. This approach is often advantageous for molding parts that are thicker than 3 millimeters. The molding process can be any of reaction injection molding, injection molding, compression molding, resin transfer molding, spin casting, rotational molding, thermoforming, roll lamination, use of a platen/laminate press, and blow molding in implementations manufactured in this manner. As a non-limiting example, compression molding may be advantageously performed for articles of thickness below 3 mm where a liner-supported TIMFF is combined with a pre-preg (reinforced or structural), and then cured with heat and pressure in a platen press for lamination or in a compression mold press, to become a part of an article such as but not limited to an engine shroud, hood, body panel, tile, or decorative part.

Figure 12:
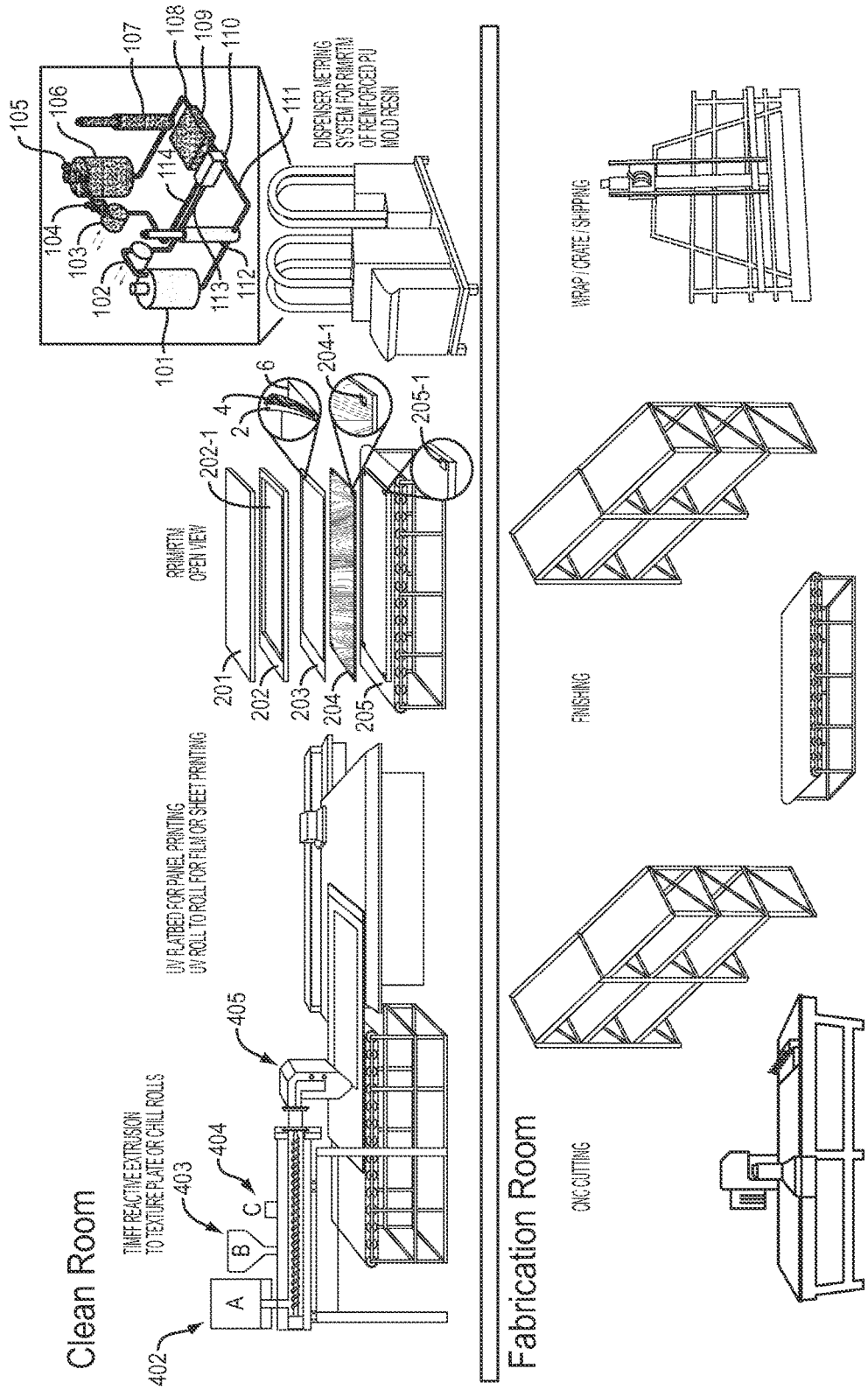
FIG. 12 is a schematic illustration of the thermoset in-mold finishing film (TIMFF) and reaction injection molding (RIM) production flow according to another embodiment of the invention.

FIG. 12 is a schematic illustration of the thermoset in-mold finishing film (TIMFF) and reaction injection molding (RIM) production flow according to another embodiment of the invention using reactive extrusion (where the registration system 204 is a texture plate).

FIGS. 13A-13B compare some details of embodiments using direct extrusion to a texture plate and embodiments using a roller.

Most of the notation shown in FIGS. 12 and 13A-13B was described in the contexts of FIGS. 5, 6, and 7. The following additional notation is used in FIGS. 12 and 13A-13B: 402: heated platen re-melter which feeds molten polyol into the extruder; 401: reactive resin extruder; 403: solids loss-in-weight feeder which feeds isocyanate flakes into the extruder; 404: small feed ports which add catalyst, drying agent, and/or whitener (if any) to the extruder; 405: sheet extrusion die; 406: nip chill rollers; and the acronym CNC: Computerized Numerical Control.

Many variations of these production flows are possible. The following are some non-limiting examples of such variations: (a) In many embodiments, the resin is fully cured and crosslinked when a decorated and coated article fabricated is removed from the mold. However, in some other embodiments, a fabricated article needs an additional post-curing step, via heating (to achieve thermal postcure), irradiation (for example, UV irradiation or electron beam irradiation), application of pressure, or a combination or sequence thereof, after removal from the mold but before the fabricated articles are stacked, to complete the curing process. (b) In some embodiments, any one or more of the steps of stacking (605), cutting/routing (606), finishing (607), cleaning and crating (608), and/or packing and shipping (609) may be omitted. For example, if the fabricated article will be used on the site where it was manufactured, the steps of crating, packing and shipping will become unnecessary. As another example, some fabricated articles emerging from the mold may be ready for use without needing any cutting/routing, finishing and/or cleaning steps.

F. Applications

With the benefit of this disclosure, it is possible for a worker of ordinary skill in the field of the invention to design customized versions of TIMFF in many different formats for an almost unlimited range of applications where a need exists to decorate and/or enhance the durability of a fabricated article. For example, a TIMFF may be formulated as an exterior, interior, sign, and/or structural grade; and it may be (a) extruded or cast as an integrated part of an inline production process, (b) produced as a durable clear and opaque white resin cast film on a liner or carrier sheet and supplied in rolls, (c) extruded or cast as an unsupported film or sheet (commonly defined in the industry as a film if the thickness does not exceed 10 mils and as a sheet if the thickness is greater than 10 mils) and cooled to B stage and stored as flat sheets or roll stock, or (d) pre-printed as a woven or non-woven prep-preg containing synthetic or/and natural fibers and cooled or partially cured to B stage. Some non-limiting envisioned applications of the many customized TIMFF products that can be designed in various formats as exterior, interior, sign, and/or structural grades are summarized below to facilitate the teaching of the invention.

The applications of the TIMFF technology include, but are not limited to, the following:

(1) Graphic panels for durable signage and structural graphics. These customizable graphic panels will be used outdoors and indoors. Depending on the use environment, they may be subject to sunlight (ultraviolet irradiation), rain, snow, and beach sand, as well as cleaning chemicals and other extreme conditions. The panel thicknesses will include, but not be limited to, 0.1 inches, 0.125 inches, 0.25 inches, 0.5 inches, 0.75 inches, and 1 inch. The maximum sheet size needed for most applications is 4 feet by 8 feet but size is not limited to a maximum of these dimensions and can be larger in one direction or in both directions if needed. A square or rectangular mold will be used in manufacturing these graphic panels, and the molding step will be followed with a post-cutting step. The applications of these graphic panels include, but are not limited to, signs, billboards, cladding, table tops, bar tops, and countertops.

(2) Molded flooring. These products will compete with high-pressure laminate (HPL), low-pressure laminate (LPL), continuously pressed laminate (CPL), luxury vinyl tile (LVT), and poly(vinyl chloride) (PVC) flooring. They will provide excellent durability, aesthetics, environmental impact, ease of installation, and suitability for wet environments, at a competitive price. Variable tile molding will be used in manufacturing most these flooring products, without a post-cutting step after the molding step. However, the use of a square or rectangular mold with the molding step being followed with a post-cutting step may instead be preferred in manufacturing some of them. The applications of these molded flooring products include, but are not limited to, kitchen tiles, bathroom tiles, and other tiles and panels used for flooring; as well as signs, cladding, table tops, bar tops, and countertops.

(3) Molded laminate panels for use as integral components in the construction of prefabricated housing structures such as modular buildings and mobile homes, for example as external walls and portions thereof, internal walls and portions thereof, roofs and portions thereof, ceilings and portions thereof, partitioning, and external cladding. Depending on the shape and size of a panel being used in this application, the preferred manufacturing process may either be the use of a square or rectangular mold with the molding step being followed with a post-cutting step or variable tile molding without a post-cutting step after the molding step (4) Applications in the transportation industry, including but not limited to uses in vehicles; as in aerospace, automotive, and marine structures and body panels. A curved panel mold (with trimming but no post-cutting after the molding step) will be used in manufacturing most of these products. However, the use of a square or rectangular mold with the molding step being followed with a post-cutting step, or the use of variable tile molding without a post-cutting step after the molding step may be preferred in manufacturing some of them. The aerospace applications include, but are not limited to, exterior body panels, interior panels, instrument panels, table tops, bar tops, countertops, doors, cabinets, and trim. The automotive applications include, but are not limited to, exterior body panels, interior panels, instrument panels, bumpers, fenders, headlight assemblies, taillight assemblies, and trim. The marine applications include, but are not limited to, boat hulls, boat decks, table tops, bar tops, countertops, doors, cabinets, and trim; where, for the purposes of this disclosure, the word "boat" is defined to include a marine transportation vehicle of any type.

(5) Customizable series of TIMFF as products for use in the IMC and IMD of different types of fabricated articles, including but not limited to the types of applications listed above. The versatility of formulations and processes used in manufacturing TIMFF allow TIMFF to be customized to meet the performance requirements of many different applications. For example, uses of TIMFF can be envisioned to decorate and/or enhance the durability of articles such as appliance housings, electronic device housings, sporting goods; and firearm and tool handles, cases and holsters.

(6) Some further non-limiting examples of the many customized TIMFF products that can be designed in various formats as exterior, interior, sign, and/or structural grades are listed in Table 1 to facilitate the teaching of the invention.

TABLE 1

Some further non-limiting examples of the many customized TIMFF products that can be designed in various formats as exterior, interior, sign, and/or structural grades.

Durable exterior graphic panels for signs, cladding and commercial rooms as well as bathroom dividers
Laminate (reinforced or structural) for vertical or horizontal application and furniture
Flooring [Residential, commercial and custom composite (will compete with laminate flooring)]
Flooring (room, kitchen and bath tile and durable exterior decorative tile)
Composite panels and coil metal aerospace, automotive and appliance body panels
Automotive interior décor panels
Life science decorative and label applications (such as on appliances)
Durable electronic housings and casings
Durable custom decorated commercial and residential siding/roofing/decking
Medical and laboratory surfaces
Bar, counter and tabletops
Molded fire arm and tool handles, cases and holsters
Interior and exterior decorative doors
Roll stock for graphic or protective lamination.
Graphic, color or clear adhesive films
Thermoformed commercial backlit signs More detailed examples of some applications of TIMFF are found in the section titled SOME ENVISIONED APPLICATIONS OF TIMFF.

G. Industry Standards

Whenever established industry standards exist for a product type and are found to be applicable to TIMFF-based products targeted for that industry, these standards will be considered in defining the performance requirements of TIMFF-based products for such an application.

For laminate flooring products, non-limiting examples of industry standards include the five publications summarized below which are incorporated herein in their entirety by reference:

(a) "Laminate Flooring Specifications and Test Methods", NALFA (North American Laminate Flooring Association) Standards Publication LF 01-2011, "Laminate Flooring" (2011). This document teaches eleven test methods: (1) resistance to residual indentation when a static load is applied, (2) ability to resist increase in thickness via swelling after exposure to water, (3) ability to retain color when exposed to a light source having a frequency range approximating sunlight coming through window glass, (4) ease of cleaning as well as stain resistance when exposed to common household substances, (5) resistance to fracture when impacted by a steel ball possessing a large diameter, (6) resistance to fracture when impacted by a steel ball possessing a small diameter, (7) resistance to abrasive wear, (8) dimensional tolerances (variances with respect to thickness, length, width, straightness, and squareness), between tiles in a manufactured free standing (unrestricted) shape, (9) ability to preserve appearance as well as to remain stable under the movement of a castor chair, (10) strength of surface bonding measured as the force required to delaminate or split away the surface of laminate flooring plank or tile, and (11) meeting governmental regulations stipulating that laminate flooring products must have low formaldehyde content. The minimum performance levels that are considered to satisfy the needs of four major application category segments (residential, light commercial, commercial, and heavy commercial) when applying each of these test methods are listed in Table 2-1 of NALFA Standards Publication LF 01-2011 (2011). A preferred embodiment of the invention intended for use as a molded flooring product meets the performance criteria listed in this table for its intended application category segment.

(b) "Laminate Flooring Sustainability Standard", NALFA (North American Laminate Flooring Association) Standards Publication LF 02-2011 (2011). This voluntary standard provides measurable market-based definitions of sustainable laminate flooring by establishing performance criteria that address environmental and social aspects throughout the supply chain. Its intent is to encourage reduction in environmental impact. It addresses sustainability in four major areas and provides a scoring system: (Section 5) Product design, to encourage integration of environmental and life-cycle thinking into the product design process. (Section 6) Product manufacturing, to encourage the quantification of environmental impacts from manufacturing and production and the taking of action to reduce these impacts. (Section 7) Durability and use, to encourage production of durable (long-lasting) products which are environmentally friendly during use. (Section 8) Social responsibility and progressive corporate governance, to encourage good business practices and continued social responsibility. The maximum number of points attainable by meeting all of the sustainability criteria described in these four sections of the standard is 98. In addition (Section 9), a manufacturer can gain up to ten points by demonstrating innovations in the product design, development, and/or manufacturing process, so that the maximum number of points attainable by a product that meets all of the sustainability criteria in addition to manifesting significant innovation is 108. The criteria used in calculating the overall sustainability score of a product and the number of points assigned to each criterion are listed in Annex A of NALFA Standards Publication LF 02-2011 (2011). In developing preferred embodiments of the invention intended for use as molded flooring products, among embodiments of similar cost that meet the performance criteria listed in Table 2-1 of NALFA Standards Publication LF 01-2011 (2011) and provide comparable levels of performance, an embodiment that has a higher sustainability score according to the scoring system detailed in Annex A of NALFA Standards Publication LF 02-2011 (2011) will be preferred over an embodiment that has a lower sustainability score.

(c) "Underlayment Pad Specifications and Test Methods", NALFA (North American Laminate Flooring Association) Standards Publication UL 01-2008, "Underlayment Pad" (2008), is intended to establish the minimum requirements that a non-attached underlayment pad must meet to achieve the NALFA Seal of Approval. The first tier establishes the minimum requirements. The second tier builds on that by adding moisture resistance properties.

(d) The NSF/ANSI 332 certification process is based on NSF 332-2012, "Sustainability Assessment for Resilient Floor Coverings" (31 Oct. 2012, NSF International). It was developed by the NSF National Center for Sustainability Standards (NCSS) in collaboration with the American National Standards Institute (ANSI). It is recommended by the Resilient Floor Covering Institute (an industry trade association). It is performed by NSF/NCSS. Sustainability is assessed quantitatively in six areas (product design, product manufacturing, long-term value, end-of-life-management, corporate governance, and innovation) and points are assigned. Total points earned determine certification at the Conformant, Silver, Gold, or Platinum level. Optionally, some embodiments of the invention will be able to earn certification at least at the Conformant level in the NSF/ANSI 332 certification process if such certification is sought.

(e) UL Environment (a business unit of Underwriters Laboratories) offers the UL GREENGUARD Certification Program (summarized in a brochure with this title published in 2013) to help manufacturers create (and buyers identify and trust) interior products and materials that have low chemical emissions, improving the quality of the air in which the products are used. All GREENGUARD-certified products must meet stringent emissions standards based on established chemical exposure criteria. Optionally, some embodiments of the invention will be able to earn the UL Environment GREENGUARD Certification if such certification is sought.

As of the date of this disclosure, we are not aware of industry standards that have been developed specifically for graphic panels for structural signage and structural graphics. We anticipate, however, that NALFA Standards Publication LF 01-2011 (2011) and NALFA Standards Publication LF 02-2011 (2011), which were developed for molded laminate flooring products, will also be helpful in selecting preferred embodiments of the invention for use as graphic panels for durable signage and structural graphics. As a non-limiting example, Table 2 illustrates how NALFA Standards Publication LF 01-2011 (2011) and some other standard tests may be used in different ways for graphic panel applications as compared with flooring applications in selecting embodiments of the invention possessing attractive performance characteristics relevant to the intended application.

TABLE 2

A non-limiting illustration of how NALFA Standards Publication LF 01-2011 (2011) and some other standard tests may be used in different ways for graphic panel applications as compared with flooring applications in selecting embodiments of the invention possessing attractive performance characteristics relevant to the intended application.

| Property | Measurement Method | Essential Performance | Desirable Performance |
|---|---|---|---|
| Properties described in the NALFA Standards Publication LF 01-2011 | Static load, Thickness swell, Light resistance, Cleanability/Stain resistance, Large ball impact resistance, Small ball impact resistance, Wear resistance, Dimensional tolerance, Castor chair resistance, Surface Bond, Formaldehyde | Must pass all 11 tests for flooring applications. The testing needs differ for outdoors graphic panel applications: The static load, light resistance, and Castor chair resistance tests will not need to be performed. The NALFA light resistance test is replaced by one or more of ASTM D1435, ASTM D4141, and/or ASTM D4364. The NALFA cleanability/stain resistance test lists 15 household substances, among which only six are relevant for an outdoors graphic panel: Distilled water, 10% citric acid, black permanent marker, # 2 pencil, wax crayon, and black paste shoe polish. The following NALFA tests will still be needed: Thickness swell, large ball impact resistance, small ball impact resistance, wear resistance, formaldehyde. Optional but useful for quality assurance: | The higher the better, both to provide a larger safety margin and to have a product that may be useful in a broader range of applications |

TABLE 2-continued

A non-limiting illustration of how NALFA Standards Publication LF 01-2011 (2011) and some other standard tests may be used in different ways for graphic panel applications as compared with flooring applications in selecting embodiments of the invention possessing attractive performance characteristics relevant to the intended application.

| Property | Measurement Method | Essential Performance | Desirable Performance |
| --- | --- | --- | --- |
| | | dimensional tolerance, surface bond. | |
| Weatherability (mainly for outdoor graphic panel products, but also for flooring products targeted for outdoor use) | ASTM D1435, ASTM D4141, and/or ASTM D4364 | 10 year outdoor life | The higher performance the better in accelerated weathering tests, both to provide a larger safety margin and to have a product that may be useful in a broader range of applications |
| Graffiti resistance | NALFA cleanability/stain resistance tests with six substances (distilled water, 10% citric acid, black permanent marker, # 2 pencil, wax crayon, and black paste shoe polish) will be useful. ASTM D6578 (Standard Practice for Determination of Graffiti Resistance) may be used as an additional and/or alternative test. | Easy to clean | Never needs cleaning |

In the fields of aerospace and automotive structures and body panels, non-limiting examples of industry standards include sets of standards that are recommended by the Society of Automotive Engineers (SAE International) and can be found and purchased on its website.

American Society for Testing and Materials (ASTM International) and the International Organization for Standardization (ISO) are additional non-limiting examples of organizations that have published industry standards some of which may be relevant to defining the performance requirements of products manufactured according to the invention. For example, ASTM D4762-11a, "Standard Guide for Testing Polymer Matrix Composite Materials" (1 Aug. 2011), summarizes the application of ASTM standard test methods (and other supporting standards) to continuous-fiber reinforced polymer matrix composite materials and is incorporated herein in its entirety by reference.

Some Envisioned Applications of TIMFF

With the benefit of this disclosure, it is possible for a worker of ordinary skill in the field of the invention to design customized versions of TIMFF in many different formats for an almost unlimited range of applications where a need exists to decorate and/or enhance the durability of a fabricated article. For example, a TIMFF may be formulated as an exterior, interior, sign, and/or structural grade; and it may be (a) extruded or cast as an integrated part of an inline production process, (b) produced as a durable clear and opaque white resin cast film on a liner or carrier sheet and supplied in rolls, (c) extruded or cast as an unsupported film or sheet (defined as a film if the thickness does not exceed 10 mils and as a sheet if the thickness is greater than 10 mils) and cooled to B stage and stored as flat sheets or roll stock, or (d) pre-printed as a woven or non-woven prep-preg containing synthetic or/and natural fibers and cooled or partially cured to B stage. Some non-limiting envisioned applications of the many customized TIMFF products that can be designed in various formats as exterior, interior, sign, and/or structural grades are detailed further below to facilitate the teaching of the invention.

A. Automotive/Aerospace—Thermoset Finishing Film (AATFF)

Advantage over paint: Coil steel supplied to forming company finished with AATFF ready to form and weld—No painting step—Superior, UV, scratch, shine, etc.—Can be customized with images, fades, metallic, pearlescent etc.

Film application and molding method: Platen press or UV lamination then molded by compression molding Coating Film:

1. Fluoropolymer topcoat layer

2. Reactive (paint-receptive) layer

Décor Layer:

1. Automotive paint

Mica (pearlescent) additive

Aluminum (metallic) additive

2. Primer layer (paint-receptive)

3. Reactive (coil steel or carbon composite-receptive) layer

B. Bio-Composite Flooring—Thermoset Finishing Film (BCF-TFF)
- Advantage over High Pressure Laminate: Less time and cost to produce—no post mounting and routing—Biobased resin—no VOCs, formaldehyde—can be used in wet environment—better UV, scratch resistance, less shrinkage
- Molding method: RIM—easy lock mold shape—textures and in register textures
- Coating Film:
  1. PU (with aluminum oxide additive) resin topcoat layer
  2. Reactive (ink-receptive) layer
- Décor Layer:
  1. Print
  2. PU with alumina trihydrate additive-primer layer (print-receptive)
- Mold Resin-PU (RIM PU with filler for quiet flooring) layer C. Exterior Graphic Lamination—Thermoset Finishing Film (EGL-TFF)
- With this film digital print and sign companies can print to the film and mount it to a specific substrate with our method. The result will be an exterior grade graphic panel that will be vandal and graffiti resistant and not fade more than 20% over a 10 year outdoor exposure.
- Coating Film:
  1. PU-acrylic hybrid resin topcoat layer
  2. Reactive (ink-receptive) layer
- Décor Layer:
  1. Print
  2. Clear print primer layer (print-receptive)
  3. Reactive (filler-receptive RIM PU-acrylic hybrid resin) layer D. Interior Wall Tile—Thermoset Finishing Film (IWT-TFF)
- Advantages over other types of wall tiles: Custom images and textures, less energy, cheaper to produce, etc.
- Coating Film:
  1. PU topcoat layer
  2. Reactive (paint-receptive) layer
- Décor Layer:
  1. Print
  2. Primer layer (print-receptive)
  3. Reactive (RIM PU receptive to talc and/or alumina trihydrate filler) layer E. Kitchen/Bath/Floor Tile—Thermoset Finishing Film (KBFT-TFF)
- Advantage over other types of KBF wall tiles: Custom images and textures, less energy, more scratch resistance, higher break point, cheaper to produce, etc.
- Coating Film:
  1. Heat-resistant resin topcoat layer
  2. Reactive (ink-receptive) layer
- Décor Layer:
  1. Print
  2. Primer layer (print-receptive)
  3. Reactive (RIM PU receptive to talc and/or alumina trihydrate filler) layer F. Solid Surface—Thermoset Finishing Film (SS-TFF)
- Advantage over other types of wall tiles: Custom images and textures (not available today with other solid surface products), addition surface protection, cheaper to produce, etc.
- Casting method: Open pour methods
- Coating Film:
  1. Hybrid—Acrylic or polyester resin topcoat layer
  2. Reactive (ink-receptive) layer
- Décor Layer:
  1. Print G. Vacuum/Thermoforming—Thermoset Finishing Film (VT-TFF)
- Thermoformed backlit signs—Decorative components (toys, auto etc.)
- Advantage: One process replaces multiple steps, can add textures, superior backlit quality, less time and expense to produce, etc.
- Coating Film:
  1. PU-acrylic hybrid resin topcoat layer
  2. Reactive (ink-receptive) layer
- Décor Layer:
  1. Print
  2. Clear print primer layer (print-receptive)
  3. Polycarbonate thermoplastic receptive

EXAMPLES

Example 1: Solvent-Mixed and Cast B-Stage PU Films

The goal was to develop a white, RIM-adhesion-layer, B-stage print film and a clear, RIM-adhesion layer, B-stage protective over-laminate film based on PU technology.

The solvent manufacturing approach offers the advantages of easy and rapid formulation preparation. Furthermore, different ways are available to coat solvent-based formulas. Hence solvents were used to prepare and test a large number of possible formulations in a relatively short period of time. Thus the development of B-stage polyurethane films via solvent mixing and casting was explored thoroughly within the design space defined by a specific non-limiting set of formulations to identify a promising formulation within this design space. It should be emphasized that this is only one of the many possible promising formulations, being used as an example for purposes of illustration, within this design space, Furthermore, many other non-limiting promising formulations may be identified by using similar experimental procedures but starting from different sets of formulation ingredients.

Materials

A major requirement for many TIMFF applications is excellent weatherability. TIMFFs developed by using PU formulations prepared from polycarbonate diol and aliphatic isocyanate raw materials are expected to manifest excellent weatherability. Hence such formulations were explored in this set of experiments, with the following formulation ingredients:

MEK solvent (methyl ethyl ketone); boiling point=80° C.; <300 ppm $H_2O$

THF solvent (tetrahydrofuran); boiling point=65° C.

UH50 (linear) polycarbonate diol; —OH equivalent weight=224 mg KOH/g UH50, UBE America Inc.

UM90 (3/1 cyclic/linear) polycarbonate diol; —OH equivalent weight=224 mg KOH/g UH50, UBE America Inc.

UH200 (linear) polycarbonate diol; —OH equivalent weight=56 mg KOH/g UH200, UBE America Inc.

Desmodur PL340 blocked IPDI isocyanate; equivalent weight as supplied=958 g/mol; activation temp=130° C.; Bayer Material Science Desmodur BL3475 blocked HDI|+IPDI isocyanate; equivalent weight as supplied=680 g/mol; activation temp=121° C.; Bayer Material Science Desmodur BL3370 blocked HDI isocyanate; equivalent weight as supplied=674 g/mol; activation temp=120° C.; Bayer Material Science Vestagon EP-BF 1350 polyisocyanate adduct; equivalent weight as supplied=325 g/mol; activation temp=160° C.; Evonik Vestagon EP-BF 9030 polyisocyanate adduct; equivalent weight as supplied=350 g/mol; activation temp=120° C.; Evonik Trixene BL 7951 blocked IPDI trimer, equivalent weight as supplied=539 g/mol; activation temp=~120° C.; Chemtura/Baxenden Chem. LTD.

Dabco T-12; dibutyltin dilaurate catalyst; Air Products Inc.

BiCat 8; 50/50 zinc-bismuth catalyst; Shepherd Chemical Co.

BiCat Z; zinc catalyst; Shepherd Chemical Co.

Incozol 2; moisture scavenger; Incorez Inc. Used as drying agent.

Di-TMP; di(trimethylolpropane); crosslinker; Perstorp Corp.

Chroma-Chem UCD 1106V white pigment; Chromaflo Technologies Inc.

Litho 105 C2S paper casting sheet; Burkhardt/Freeman, Inc.

Sample Preparation

Mixing:

Each PU formulation was prepared as two separate parts A and B, and then poured together in a jar and rolled for 1 hour prior to casting films.

Part A consisted of UM50, UM200 or UM90 (3:1) polycarbonate diol, MEK solvent, catalyst, drying agent, and whitener, if any.

Diols were heated to 65° C. to be able to pour them from their canisters.

Catalyst, drying agent, and MEK solvent were added to the still warm diol and the mixture was rolled overnight to achieve complete dissolution of the polyol.

A crosslinker, di-TMP was added to some Parts A. In order to achieve solubilization of di-TMP in Part A, it was necessary to melt the required amount into 115° C. molten polycarbonate diol. After the di-TMP was dissolved, the other Part A components were then added.

Part B consisted of isocyanate and MEK and THF solvents. The isocyanate and solvents were added together and rolled in a jar overnight to achieve complete dissolution.

Coating:

A Mayer rod #100 was used on a ChemInstruments drawdown coater to cast thin (4-5 mils dry thickness) urethanes onto casting paper, UV-ink printed paper and Bemis thermoplastic urethane (white or printed).

A ChemInstruments LC-100 bull nose coater with 30 mil shims between the coater rolls was used to cast thick (10-20 mils dry thickness) PU formulas.

Sample Drying:

Samples Were Dried Slowly in Stages:

(1) Thick, free-film PU sheets were dried 60 minutes on lab bench at room temperature followed by 10 minutes at 50° C. in a circulating air oven. These very mild drying conditions were necessary to end up with a film of sufficient thickness that is still flexible enough to be manually manipulated a sheet.

(2) Drying stages applied to thin PU coatings on printed and unprinted Bemis films and on UV-ink printed paper were: 20 minutes at room temperature, 20 minutes at 60° C. and finally, 15 minutes at 75° C.

Sample Curing:

It is important to note that a B-stage film sample will only be dried (not cured) at the end of the drying stages summarized above. Film samples were subsequently cured to completion in the circulating air oven for 30 minutes at 130° C.

Testing for Rapid Initial Screening of Formulations

The testing program summarized below was implemented for the rapid initial screening of many formulations prepared by using the ingredients listed above. This testing program consists of techniques used to discriminate rapidly between better and worse formulations in the formulation development stage of the project. Additional (more quantitative) tests, familiar to workers in the field of the invention, can be used to characterize the formulations as well as the dried but uncured and the cured films obtained from the formulations, and will be useful in future work focusing on formulation development but were not needed for preliminary screening.

Hardness and elasticity were determined visually under 20× magnification by poking, pulling and scraping on a sample with sharp stainless steel tip.

Clarity and yellowness were determined visually.

Coefficient of expansion upon curing of a PU film was measured by marking a length on a dried but uncured film, curing the film and then re-measuring the marked length.

Percentage of retained solvent was measured by weighing an aluminum dish containing undried PU and then re-weighed following various drying stages.

Solvent PU formula viscosities were judged by experience to fall between 200 and 500 centipoise (at room temperature).

Identification of an Exemplary Promising Formulation Within Design Space

Many formulations were prepared by using the ingredients listed above and subjected to the testing program summarized above for the rapid screening of initial formulations.

After some preliminary experiments, UBE's UM-90 polyol, which has the consistency of taffy at room temperature and hence had to be heated up to the range of 60 to 65° C. to become pourable, was selected from among the tested polycarbonate diols for use in further experiments.

After some preliminary experiments, Evonik's EP-BF 9030 polyisocyanate, which has an adduct structure wherein a single molecule has two isocyanate groups that react at lower temperature and two isocyanate groups that react at elevated temperature, was selected from among the tested isocyanates for use in further experiments.

After some preliminary experiments, Dabco T-12 was selected from among the tested catalysts for use in further experiments.

The crosslinker di-TMP created difficulties in processing without providing a significant further improvement in the cured film strength and hardness. Hence it was not included in the identified exemplary promising formulation.

The Incozol 2 drying agent (moisture scavenger), which reduces the amount of water in the reactive system and thus also reduces reactions between water and isocyanates, was found to be useful in reducing the frequency of bubbles on the dried and cured PU films.

Only the UCD 1106V white pigment was used in this series of preliminary screening experiments. Further improvements in PU film properties may be envisioned to result from the consideration of alternative pigments in future work.

The use of MEK as the sole solvent was sufficient for Part A of the formulation. On the other hand, a mixture of MEK and THF was needed for Part B because the EP-BF 9030 isocyanate did not dissolve in pure MEK.

The formulation listed in Table 3, which was cast on Burkhardt/Freeman casting paper grade Litho 105 C2S, is a promising non-limiting exemplary formulation identified from among the tested formulations.

TABLE 3

An exemplary promising solvent mixed and cast B-stage PU formulation identified within a design space comprising polycarbonate diol and aliphatic isocyanate raw materials. The isocyanate:polyol crosslinking ratio {NCO:OH} is 1.24 to 1 in the formulation shown below.

| Part | Component | Grams |
| --- | --- | --- |
| Part A | UM90 polyol | 30 |
| | MEK solvent | 30 |
| | Dabco T-12 catalyst | 0.95 |
| | Incozol 2 drying agent | 1.9 |
| | UCD 1106V white pigment | 2.58 |
| Part B | EP-BF 9030 isocyanate | 65.17 |
| | MEK solvent | 43.45 |
| | THF solvent | 21.72 |

After the preparation of Part A and Part B, the final mixing step consists of adding Part A to Part B and agitating (via rolling or stirring) for 60 minutes.

Example 2: Extrusion-Mixed and Cast B-Stage PU Films

This example involves switching from the solvent mixing and casting of B-stage PU films to solvent-free mixing and casting via extrusion. While the solvent manufacturing approach offers the advantages of easy and rapid formulation preparation, the extrusion manufacturing approach offers some other advantages; namely, (a) easier manufacturing of defect-free films (since no solvent is used so that there is no risk of formation of defects such as bubbles of solvent trapped in the film), (b) avoidance of the economic as well as environmental costs of the use of chemicals (solvents) which don't end up in the manufactured product, and (c) the ability to use a broader range of casting sheets that can be wetted uniformly by the uncured PU formulation. Hence both the solvent manufacturing and the extrusion manufacturing approaches are useful in practice and each approach is more beneficial to use than the other under different circumstances.

The initial formulation used in the extrusion manufacturing trials differs from the solvent manufacturing formulation shown in Table 3 by the omission of the two solvents (MEK and THF) as well as the omission of the whitener UCD 1106V.

The following are non-limiting examples of the design variables to be evaluated during the extrusion manufacturing trials:
Variation of NCO:OH feed rate ratio on the extruder from 1.1:1.0 up to 1.5:1.0.
Evaluating neopentyl glycol at 1%, 3% and 5% by weight (based on total weight of polyol and isocyanate) as a reactive formulation ingredient.
Substituting BiCat 8 for Dabco T-12 catalyst to determine whether doing so can lower the temperature needed for in-mold or for post-mold curing.
Testing the use of pure dry $TiO_2$ as a white pigment.
Varying the amount of Incozol 2.
Evaluating the use of alternative casting papers.

The material flow through the melt mixing process may follow the following sequence of steps in some non-limiting embodiments of the extrusion manufacturing process:

(1) Feeding of molten UM90 into the barrel of an extruder running at a temperature in the range of 60° C. to 85° C. by a heated platen remelter.

(2) Addition of EP-BF 9030 isocyanate flakes to the extruder by a solids feeder, with material temperatures preferably remaining below 100° C. and the material remaining in the isocyanate mixing portion of the barrel for less than 10 minutes. If the mixing is intense, the extruder operator may use the extruder's hot oil system to cool the mixing barrel to <100° C.

(3) Catalyst, drying agent, and whitener (if any) are added to the extruder via small feed rate ports.

(4) The uniform melted mixture then feeds a melt gear pump leading directly to a slot coating die or the melted mixture fills pails or drums for transport to a coating facility.

FIGS. 14A-14C show the details of one possible equipment layout that may be used in manufacturing embodiments of the invention by the method described in Example 2. (This non-limiting example includes the incorporation of an optional additive that renders the printable resin white and opaque in the fragment of the drawing labeled as "White Option" while this additive is not used and thus the printable resin is clear in some other non-limiting examples.) Most of the notation has been introduced in FIGS. 1, 12, and 13. The following additional notation is used: 407: B-stage TIMFF applied to release liner, 408: B-stage TIMFF with release liner, 501: TIMFF resin (print and release liner optional), 502: structural or reinforced pre-preg (B-stage roll stock), 503: TIMFF white option (print and release liner optional), 504: combined layers, 505: laminating rollers, 506: pull rollers, 507: cut and stacked finished custom laminate, 508: top mold, 509: texture plate, 510: bottom mold, 511: frame of platen press, and 512: laminate sheet cutter.

Figure 15A:
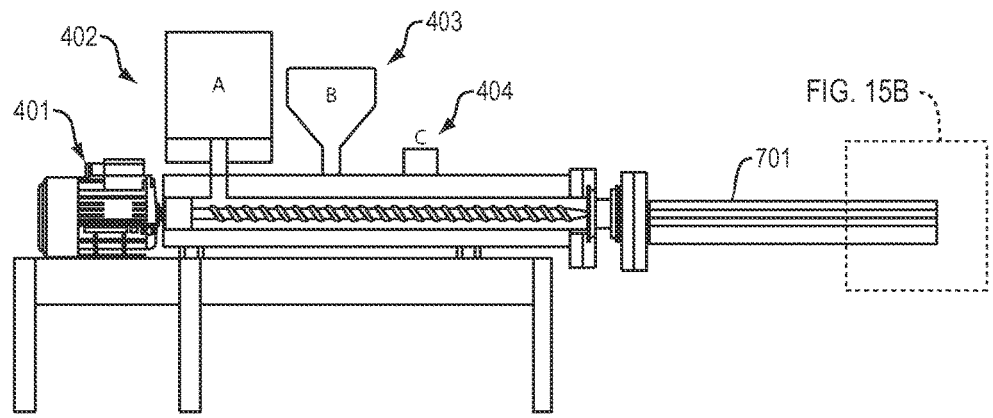
FIGS. 15A-15D show the details of another possible equipment layout that may be used in manufacturing embodiments of the invention by the method described in Example 2, where
Figure 15B:
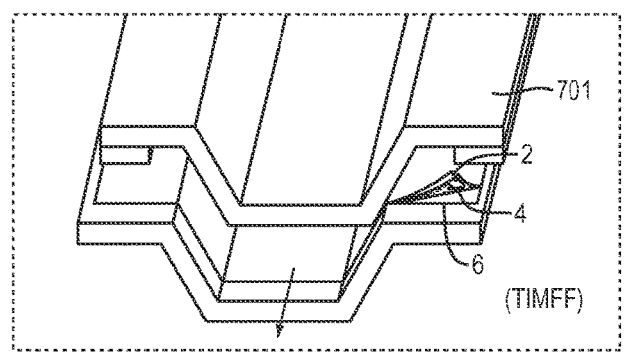
Figures 15C, 15D:
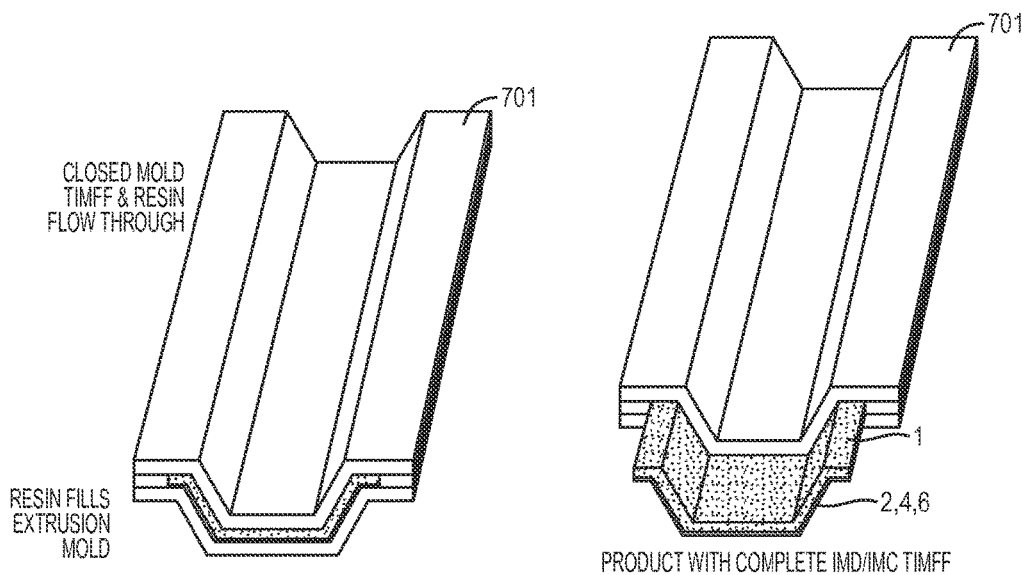
Figure 16A:
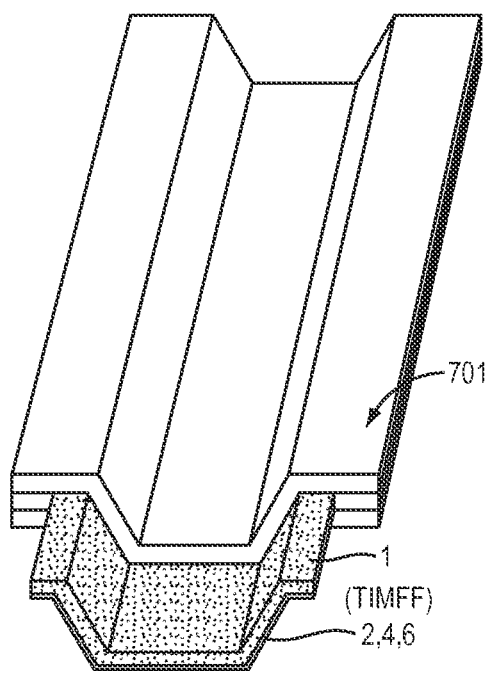
Figure 16B:
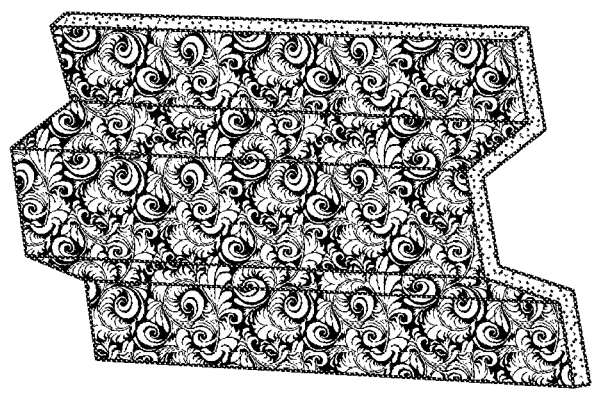

FIGS. 15A-15C show the details of another possible equipment layout that may be used in manufacturing embodiments of the invention by the method described in Example 2 while FIGS. 16A-16B illustrate a completed in-mold coated and in-mold decorated article that may be manufactured by using the equipment layout shown in FIGS. 15A-15C. Most of the notation used in these drawings has been introduced in the context of the earlier drawings. The only new notation is 701: TIMFF extrusion molding die. The method illustrated in FIGS. 15A-15C combines decorating and coating extruded articles by adding an extrusion mold and running the TIMFF through the mold (or die) at the same time the product is extruded. Decorative extrusions including framing material, furniture edging and many others can be made by using this fabrication method. In FIG. 16B, the completed article is shown from a perspective where the TIMFF (combined IMD/IMC) placed on the article can be clearly seen.

Figure 18A:
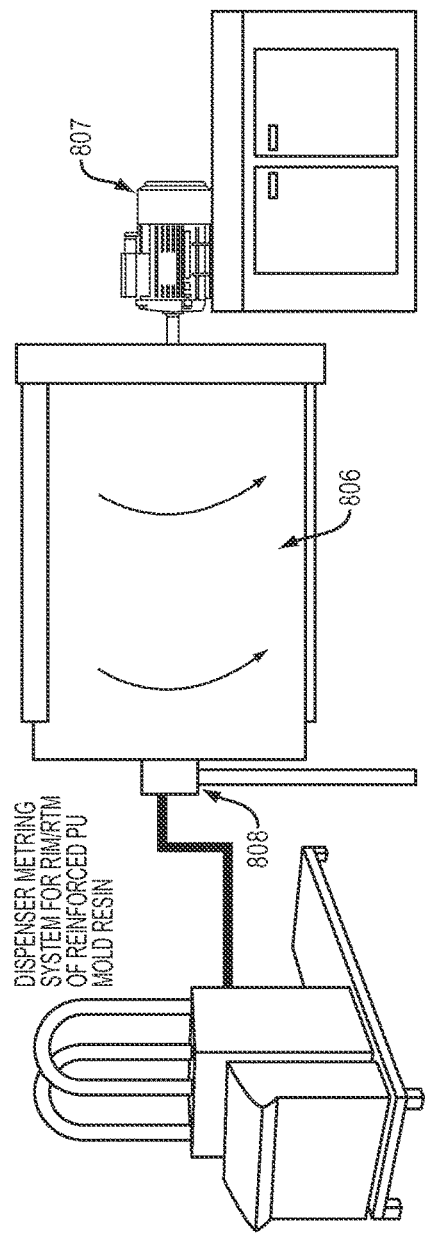
FIGS. 18A-18C show further details of the manufacturing of embodiments of the invention according to the method illustrated in FIGS. 17A-17C as well as illustrating a completed in-mold coated and in-mold decorated article that may be manufactured by using this method where
Figure 18C:
Figure 18B:
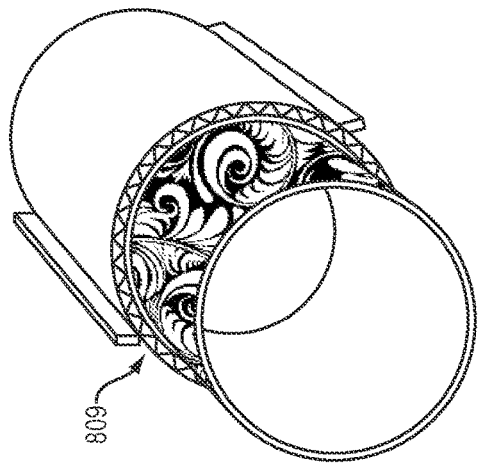

FIGS. 17A-17C show some of the details of yet another possible equipment layout that may be used in manufacturing embodiments of the invention by the method described in Example 2 while FIGS. 18A-18C show further details of the manufacturing of embodiments of the invention according to the method illustrated in FIGS. 17A-17C. A completed in-mold coated and in-mold decorated article that may be manufactured by using this method is illustrated in FIG. 18C. The method of FIGS. 17A-17C and 18A-18C involves the use of spin casting using TIMFF to produce custom decorated or labeled pipes or tubes. The following notation is used: 801: extruded coating resin on flexible texture plate with printed and extruded white TIMFF layer, 802: TIMFF and texture plate rolled into mold, 803: spin bars hold mold to spin motor assembly, 804: tube/pipe mold, 806: spin molding chamber, 807: motor assembly, 808: mold cap and resin feed line, 809: demold graphic tube/pipe, and 810: tube or pipe complete with TIMFF (IMD/IMC. Not only will these products be decorated and coated but they can be texturized at the same time. In one particular embodiment, the TIMFF resin is extruded onto a flexible texture plate (possibly silicone rubber attached to a flexible mold plate). The flat resin-coated texture plate is then printed, white film is applied to it, and then it is bent around to form a cylinder mold. This cylinder mold is capped and then mounted onto the motor assembly. Reinforced resin is injected during the spin casting process. The mold continues to spin until the reactive resin cures. The final completed decorated and coated tube or pipe can then be removed from the mold.

The present disclosure may be embodied in other specific forms without departing from the spirit or essential attributes of the invention. Accordingly, reference should be made to the appended claims, rather than the foregoing specification, as indicating the scope of the disclosure. Although the foregoing description is directed to the preferred embodiments of the disclosure, it is noted that other variations and modification will be apparent to those skilled in the art, and may be made without departing from the spirit or scope of the disclosure.

What is claimed:

1. A method for manufacturing an in-mold decorated and in-mold coated thermoset article, said method comprising: (A) placing, on casting paper or texture plate, a durable coating film that is a third B-stage polyurethane resin, said third B-stage polyurethane resin optionally containing an additive, a finish, or a combination or mixture thereof, selected to enhance the durability of the coated surface of the finished article by improving its scratch resistance, wherein the casting paper or texture plate are located in a mold; (B) applying a printable film comprising a reactive and printable resin to the durable coating film, thereby to form the printable film, where (i) said reactive and printable resin is a first B-stage polyurethane resin and a second B-stage polyurethane resin; (C) optionally printing an image, pattern, text, indicia, or combination thereof onto said printable resin; (D) filling the mold with an article resin, the article resin is a fourth B-stage polyurethane resin; and (E) performing a curing reaction to thereby form an integrally bonded molded article.

2. The method of claim 1, wherein the step of performing a curing reaction comprises a step of performing a curing reaction under a first curing reaction condition to create a partially crosslinked state.

3. The method of claim 2, where the step of performing a curing reaction further comprises a step of performing a second curing reaction under a second curing reaction condition to create a fully crosslinked state of the unsupported laminate film and the article resin.

4. The method of claim 1, where placing of the durable coating film on casting paper or texture plate is performed by using a method selected from the group consisting of solvent mixing and casting, or extrusion mixing and casting, or a combination thereof.

5. The method of claim 1, where the first B-stage polyurethane resin is clear or contains an additive that makes it white and opaque; said additive is selected from the group consisting of cellulosic additives, talc, ultra-white alumina trihydrate, white glass powder, titanium white, and combinations or mixtures thereof.

6. The method of claim 1, where said printing on said first B-stage polyurethane resin is performed by using a technique selected from the group consisting of digital printing, flatbed printing, UV printing, gravure printing, screen printing, offset printing, offset lithography, inkjet printing, engraving, reprography, thermographic printing, flexography, and combinations or sequences thereof.

7. The method of claim 1, where said optional additive that enhances the scratch resistance of said durable coating film is aluminum oxide.

8. The method of claim 1, where the first B-stage polyurethane resin, the second B-stage polyurethane resin, the third B-stage polyurethane resin and the forth B-stage polyurethane resin may comprise an optional additional ingredient chosen from the group consisting of reinforcing agents, impact modifiers, antistatic agents, fire retardants, antioxidants, UV stabilizers, photoinitiators, thermal initiators, catalysts, inhibitors, buffers, dispersants, surfactants, stabilizers, compatibilizers, rheology modifiers, defoamers, drying agents, blowing agents, mold release agents, or any combination or mixture thereof.

9. The method of claim 1, where said molding process is selected from the group consisting of reaction injection molding, injection molding, compression molding, resin transfer molding, spin casting, rotational molding, thermoforming, roll lamination, use of a platen/laminate press, and blow molding.

10. The method of claim 1, where said molding process is reaction injection molding.

11. The method of claim 1, wherein the first B-stage polyurethane resin, the third B-stage polyurethane resin and the fourth B-stage polyurethane resin are each semi-cured.

* * * * *